US012572680B2

(12) United States Patent
Zhuo et al.

(10) Patent No.: US 12,572,680 B2
(45) Date of Patent: Mar. 10, 2026

(54) DATA MASKING METHOD AND DEVICE

(71) Applicant: Huawei Cloud Computing Technologies Co., Ltd., Guizhou (CN)

(72) Inventors: Zhongliu Zhuo, Chengdu (CN); Xinyu Wang, Chengdu (CN); Quandong Li, Gui'an (CN); Zhonggang Wang, Chengdu (CN); Fei Qu, Chengdu (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 208 days.

(21) Appl. No.: 18/486,478

(22) Filed: Oct. 13, 2023

(65) Prior Publication Data

US 2024/0037269 A1 Feb. 1, 2024

Related U.S. Application Data

(63) Continuation of application No. PCT/CN2021/137956, filed on Dec. 14, 2021.

(30) Foreign Application Priority Data

Apr. 16, 2021 (CN) .......................... 202110413238.7

(51) Int. Cl.
*G06F 21/62* (2013.01)
*G06F 16/28* (2019.01)
*G06F 16/335* (2019.01)
*G06F 16/248* (2019.01)
*G06F 21/60* (2013.01)

(52) U.S. Cl.
CPC ........ *G06F 21/6218* (2013.01); *G06F 16/284* (2019.01)

(58) Field of Classification Search
None
See application file for complete search history.

(56) References Cited

U.S. PATENT DOCUMENTS 9,692,768 B1 * 6/2017 Kayyoor ............. G06F 16/9024
11,797,701 B1 * 10/2023 Angelo ................... G06F 16/26
2006/0224631 A1 * 10/2006 Kwon ................... G06Q 99/00
(Continued)

FOREIGN PATENT DOCUMENTS

CN 107169079 A 9/2017
CN 110489990 A 11/2019
CN 111125767 A 5/2020

OTHER PUBLICATIONS

Gabor Angeli et al.,"Leveraging linguistic structure for open domain information extraction",Proceedings of the 53rd Annual Meeting of the Association for Computational Linguistics and the 7th International Joint Conference on Natural Language Processing (vol. 1: Long Papers) 2015,total 11 pages.
(Continued)

*Primary Examiner* — Venkat Perungavoor
(74) *Attorney, Agent, or Firm* — Conley Rose, P.C.

(57) ABSTRACT

A data masking method includes: displaying one or more groups of relational data, where the relational data includes a data subject, privacy data, and a relationship that the data subject and the privacy data meet; obtaining selection of a user for target relational data in the one or more groups of relational data; and performing masking processing on the target relational data in a data source.

20 Claims, 13 Drawing Sheets

(56) References Cited

U.S. PATENT DOCUMENTS

| 2009/0303237 | A1* | 12/2009 | Liu | H04L 63/0414 |
| | | | | 345/440 |
| 2014/0373182 | A1* | 12/2014 | Peri | G06F 21/6245 |
| | | | | 726/30 |
| 2020/0050966 | A1 | 2/2020 | Enuka et al. | |
| 2020/0250139 | A1 | 8/2020 | Muffat et al. | |
| 2020/0311294 | A1* | 10/2020 | Sim-Tang | G06F 16/1774 |
| 2021/0192651 | A1* | 6/2021 | Groth | G06Q 30/0206 |
| 2022/0092468 | A1* | 3/2022 | Mukherjee | G06F 21/85 |
| 2022/0222426 | A1* | 7/2022 | Zionpour | G06T 13/00 |

OTHER PUBLICATIONS

Livio Baldini Soares et al.,"Matching the Blanks: Distributional Similarity for Relation Learning",Proceedings of the 57th Annual Meeting of the Association for Computational Linguistics,2019,total 11 pages.

Anthony Fader et al.,"Identifying relations for open information extraction",Proceedings of the 2011 conference on empirical methods in natural language processing,2011,total 11 pages.

"ML-Driven Classification",Sep. 2018, total 2 pages,URL:https://bigid.com/wp-content/uploads/2018/09/Privacy-Aware-ML-Driven-Classification-green.pdf.

YuJi Yang et al.,"Accurate and Efficient Method for Constructing Domain Knowledge Graph",ISSN 1000-9825, Coden Ruxuew Journal of Software,2018,29(10):2931-2947 [doi:10.13328/j.cnki.jos.005552],Feb. 8, 2018,with English abstract total 17 pages.

* cited by examiner

Asset list

| OBS | RDS | Big data | Code library |

| Add a self-owned bucket | Add another bucket |

| Asset name | Bucket name | Bucket type | Region | Creation time | Operation |
|---|---|---|---|---|---|
| AAA | 000 | Private | Ulanqab, North China | 10:23:00 7/12/2019 | Select |
| BBB | 001 | Private | Ulanqab, North China | 10:24:00 7/12/2019 | Select |
| CCC | 002 | Private | Ulanqab, North China | 10:25:00 7/12/2019 | Select |
| DDD | 003 | Private | Ulanqab, North China | 10:26:00 7/12/2019 | Select |

FIG. 3

OBS | RDS | Big data

| Data subject name | Belonged-to data source name | Total quantity of occurrences | Data subject confidence | Previous identification time | Operation |
|---|---|---|---|---|---|
| Wu WANG | AAA | 20 | 98% | 10:23:00 7/12/2019 | Select |
| Liu ZHAO | BBB | 18 | 10% | 10:24:00 7/12/2019 | Select |
| San ZHANG | CCC | 4 | 85% | 10:25:00 7/12/2019 | Select |
| Si LI | DDD | 6 | 80% | 10:26:00 7/12/2019 | Select |

Please input a
data subject name [_____] [Determine]

[OBS] [RDS] [Big data]

| Data subject name | Belonged-to data source name | Total quantity of occurrences | Data subject confidence | Previous identification time | Operation |
|---|---|---|---|---|---|
| Wu WANG | AAA | 20 | 98% | 10:23:00 7/12/2019 | Select |
| Liu ZHAO | BBB | 18 | 10% | 10:24:00 7/12/2019 | Select |
| San ZHANG | CCC | 4 | 85% | 10:25:00 7/12/2019 | Select |
| Si LI | DDD | 6 | 80% | 10:26:00 7/12/2019 | Select |

FIG. 5

① Preset relationship configuration     ② User-defined relationship configuration     ③ Add prior knowledge     ④ Subsequent configuration processing ⊙ Preset relationship configuration: configure a relationship commonly used by the data subject and the privacy data

| Preset relationship name | Relationship description | Example matching | Operation |
|---|---|---|---|
| Relationship 1 | Match a parent-child relationship | A is a father of B | Select |
| Relationship 2 | Match a graduated school | A graduated from a school B | Select |
| Relationship 3 | Match the relationship 3 | ... | Select |

Next     Cancel

FIG. 6

Association result between a data subject and privacy data

Please input a data subject name 🔍

60

| Data subject name | Relationship name | Privacy data | Confidence | Previous association time | Mark | Operation |
|---|---|---|---|---|---|---|
| Wu WANG | father_son | Liu WANG | 98% | 10:23:00 7/12/2019 | — | Select |
| Wu WANG | Graduated school | Peking University | 10% | 10:24:00 7/12/2019 | False positive | Select |
| Liu ZHAO | Born in | 1998 | 85% | 10:25:00 7/12/2019 | — | Select |
| San ZHANG | Test time | March 10 | 80% | 10:26:00 7/12/2019 | — | Select |
| Si LI | Identity card | 510*****323 | 80% | 10:27:00 7/12/2019 | — | Select |

Relational data

FIG. 9

DATA MASKING METHOD AND DEVICE

CROSS-REFERENCE TO RELATED APPLICATIONS

This is a continuation of International Patent Application No. PCT/CN2021/137956 filed on Dec. 14, 2021, which claims priority to Chinese Patent Application No. 202110413238.7 filed on Apr. 16, 2021. The disclosures of the aforementioned applications are hereby incorporated by reference in their entireties.

TECHNICAL FIELD

This disclosure relates to the field of data processing, and in particular, to a data masking method and a device.

BACKGROUND

Data masking refers to processing of some privacy data, for example, deformation processing on the data, to ensure reliable protection of the privacy data.

A current data masking method generally includes: discovering privacy data in a data source by using a privacy data discovery technology, and performing masking processing on the discovered privacy data. However, some data that a user considers as no need to be masked is also masked as privacy data, affecting masking flexibility.

SUMMARY

Embodiments of this disclosure provide a data masking method and a device. Technical solutions are as follows.

According to a first aspect, a data masking method is provided, where the method may be executed by a processing device. The method includes: displaying one or more groups of relational data, where the relational data includes a data subject, privacy data, and a relationship that the data subject and the privacy data meet; obtaining selection of a user for target relational data in the one or more groups of relational data; and performing masking processing on the target relational data in a data source.

In the data masking method provided in embodiments of this disclosure, masking processing is performed on target relational data in a data source based on the target relational data selected by a user, to effectively exclude data that does not need to be masked, and implement flexible masking of data in the data source. In addition, at least one group of relational data is displayed, so that the user can accurately select a to-be-masked object, thereby improving masking accuracy.

There may be a plurality of manners in which the processing device performs masking processing on the target relational data in the data source. In embodiments of this disclosure, the following several manners are used as examples for description.

In a first masking manner, a masking target in the target relational data is obtained, and masking processing is performed on the masking target in the target relational data. The masking target is one or more of the following: the data subject, the privacy data, and the relationship that the data subject and the privacy data meet. In an optional manner, the processing device may directly obtain a preset masking target. For example, the masking target is the privacy data. In another optional manner, the processing device may obtain selection of the user for the masking target in the target relational data. By selecting the masking target by the user, masking processing can be targeted to perform on the target relational data in the data source, thereby improving accuracy of the masking processing.

It may be understood that, when the masking target includes a relationship, actual masked content in the data source is content presented in the relationship in plaintext. In an optional example, the content presented in the relationship in plaintext may be determined based on example matching information of the relationship.

Optionally, if the relationship is a relationship in new relational data obtained through knowledge reasoning, plaintext content of an indirect relationship for obtaining the relationship through reasoning may be used as the actual masked content of the data source.

For example, the process of performing masking processing on the target relational data in a data source includes: performing hash masking, cover masking, replacement masking, transform masking, encryption masking, or shuffle masking on the masking target in the target relational data in the data source, where the masking target is one or more of the following: the data subject, the privacy data, and the relationship that the data subject and the privacy data meet.

In a second masking manner, a masking degree is obtained; and masking processing is performed on the target relational data in the data source based on the masking degree. In an optional example, the masking degree is for reflecting a proportion of a masked character to total characters of the target relational data. That masking processing is performed on the target relational data in the data source based on the masking degree means that after the masking processing, the proportion of the masked character to the total characters of the target relational data is equal to the masking degree. In another optional example, one or more elements in the target relational data correspond to a masking degree. The masking degree of the element is for reflecting a proportion of a masked character in the element to total characters of the corresponding element. That masking processing is performed on the target relational data in the data source based on the masking degree means that after masking processing is performed on an element, a proportion of a masked character in the element to total characters of the element is equal to a masking degree of the element.

In an optional manner, the processing device may directly obtain a preset masking degree. In another optional manner, the processing device may obtain selection of the user for the masking degree of the target relational data. By selecting the masking degree by the user, masking processing can be flexibly performed on the target relational data in the data source, thereby implementing personalized masking.

There may be a plurality of execution occasions of the masking processing. In an optional implementation, the masking processing is performed when being triggered by the user. The processing device provides a masking processing control, and starts to perform masking processing on the target relational data in the data source after detecting a trigger operation of the user for the masking processing control. In another optional implementation, the masking processing is performed after the data source reaches a specific condition. For example, after determining, from the data source stored in a cloud computing system, the target relational data that meets a data masking condition, the processing device performs masking processing on the target relational data in the data source. The data masking condition includes one or more of the following: the data subject in the target relational data reaches a deregistration condition; and storage duration of the target relational data reaches target duration.

After masking processing is performed on the target relational data in the data source, the processing device may process a data source obtained through masking processing. In embodiments of this disclosure, the following several processing manners are used as examples for description. In a first processing manner, the data source obtained through masking processing is stored. In a second processing manner, the data source obtained through masking processing is provided for a data analysis device. In a third processing manner, the data source obtained through masking processing is shared. For example, when an application environment is a data analysis system, the processing device may share the data source obtained through masking processing.

Optionally, the processing device may further display a confidence of the one or more groups of relational data, where the confidence reflects credibility that the data subject and the privacy data meet the relationship, and the confidence is a reference for the user to select the target relational data. The user may determine, by using the confidence, whether to select specific relational data as the target relational data for masking processing.

For example, the processing device may determine the confidence based on prior knowledge of the relational data provided by the user. The confidence is determined combined with the prior knowledge, so that reliability of the determined confidence can be improved, and a probability of an omission or a false positive of the relational data can be reduced, so that the user can more accurately select the target relational data.

Optionally, the processing device may alternatively determine a confidence of the one or more groups of relational data based on a factor graph. The confidence determined based on the factor graph has high accuracy.

In an optional manner, the method further includes: obtaining a data subject, and obtaining a relationship; and obtaining, from the data source, privacy data that meets the obtained relationship with the obtain data subject, where the obtained data subject, the obtained privacy data, and the obtained relationship form the relational data.

There is a plurality of optional implementations for obtaining the data subject. In embodiments of this disclosure, the following two implementations are used as examples for description.

In a first optional implementation, the processing device automatically obtains the data subject. In an optional example, the processing device obtains a preset data subject, for example, a data subject configured by an administrator, or a data subject pre-delivered by a management device to the processing device. In another optional example, the processing device obtains a data subject from a specified data source based on a preset rule. The preset rule includes one or more of the following: obtaining a Chinese name of a natural person in a specified data source as the data subject; obtaining an English name of the natural person in the specified data source as the data subject; and obtaining a nickname of the natural person in the specified data source as the data subject. The preset rule may alternatively be in another manner. This is not limited in embodiments of this disclosure. In still another optional example, the processing device obtains a data subject from a specified data source based on a privacy data discovery technology. The specified data source may be the foregoing data source from which the relational data needs to be extracted or a data source associated with the foregoing data source from which the relational data needs to be extracted. The privacy data discovery technology includes one or more of a regular expression technology, a keyword extraction technology, and a natural language processing (NLP) technology. In yet another optional example, the processing device receives a keyword input by the user, and obtains a data subject from a specified data source based on the keyword. Because the data subject is automatically obtained by the processing device, user operations can be effectively reduced, and operation complexity can be reduced.

In a second optional implementation, a manually input data subject is obtained.

In an optional example, the processing device displays one or more data subjects in the data source from which the relational data needs to be extracted, and obtains a data subject selected by the user from the one or more data subjects. In this way, the processing device displays the one or more data subjects for the user to select, so that efficiency of inputting the data subject by the user can be improved.

In another optional example, the processing device displays one or more data subjects in the data source from which the relational data needs to be extracted, and obtains a new data subject input by the user. In this way, when displaying the one or more data subjects for the user to select, the processing device may further receive the new data subject input by the user, to support the user in selecting two data subject input manners: inputting the data subject, and directly inputting the new data subject, thereby enriching operation manners of the user. In addition, due to diversity of data subjects, the processing device may not be able to exhaust data subjects required by the user. By independently inputting a data subject by the user, it can be ensured that the obtained data subject is the data subject required by the user.

In still another optional example, the processing device directly obtains a new data subject input by the user. In this way, the processing device enables, through a data subject input box, the user to directly input the data subject, so that accuracy of inputting the data subject by the user can be improved.

There is a plurality of optional implementations for obtaining the relationship. In embodiments of this disclosure, the following two implementations are used as examples for description.

In a first optional implementation, the processing device automatically obtains the relationship. In an optional example, the processing device obtains a preset relationship. In another optional example, the processing device obtains a relationship from a specified data source based on a preset relationship rule. The preset relationship rule includes one or more of the following: obtaining a Chinese name of a natural person in a specified data source as the relationship; obtaining an English name of the natural person in the specified data source as the relationship; and obtaining a nickname of the natural person in the specified data source as the relationship. The preset relationship rule may alternatively be in another manner. This is not limited in embodiments of this disclosure. In still another optional example, the processing device obtains a relationship from a specified data source based on a privacy data discovery technology. The specified data source may be the foregoing data source from which the relational data needs to be extracted or a data source associated with the foregoing data source from which the relational data needs to be extracted. Because the relationship is automatically obtained by the processing device, user operations can be effectively reduced, and operation complexity can be reduced.

In a second optional implementation, a manually input relationship is obtained.

In an optional example, the processing device displays one or more relationships in the data source from which the relational data needs to be extracted, and obtains a relationship selected by the user from the one or more relationships. In this way, the processing device displays the one or more relationships for the user to select, so that efficiency of inputting the relationship by the user can be improved.

In another optional example, the processing device displays one or more relationships in the data source from which the relational data needs to be extracted, and obtains a new relationship input by the user. In this way, when displaying the one or more relationships for the user to select, the processing device may further receive the new relationship input by the user, to support the user in selecting two relationship input manners: inputting the relationship, and directly inputting the new relationship, thereby enriching operation manners of the user. In addition, due to diversity of relationships, the processing device may not be able to exhaust relationships required by the user. By independently inputting a relationship by the user, it can be ensured that the obtained relationship is the relationship required by the user.

In still another optional example, the processing device directly obtains a new relationship input by the user. In this way, the processing device enables, through a relationship input box, the user to directly input the relationship, so that accuracy of inputting the relationship by the user can be improved.

The one or more groups of relational data may be displayed in a form of a table or a relationship diagram, or may be displayed in a form of a knowledge graph (for example, a knowledge graph of Deepdive). Because both the data subject and the privacy data in the relational data may be considered as entities, a form of the relational data is relatively consistent with the form of the knowledge graph. A structure of the relational data can be effectively described by using the knowledge graph, so that the user can intuitively view the relational data.

If the processing device supports a knowledge graph function, after obtaining a plurality of pieces of relational data, the processing device may also perform knowledge reasoning based on the knowledge graph to obtain new relational data. Optionally, the processing device displays the new relational data obtained by performing knowledge reasoning based on the knowledge graph. In this way, the new relational data is a reference for the user to select new target relational data. For example, the new relational data is used as the new target relational data, or relational data similar to the new relational data in other relational data is used as the new target relational data. In addition, the new relational data may be used by the user to determine a new relationship. The new relationship may be used for next masking processing. To be specific, during next masking processing, the obtained relationship may include the new relationship.

The processing device obtains corresponding privacy data based on the obtained one or more data subjects and one or more relationships. When obtaining the privacy data from the data source, the processing device may analyze the data source based on a scanning rule, to obtain the privacy data. In an optional manner, the scanning rule includes: scanning and analyzing the data source in a scanning unit of m sentences, where m is a positive integer; or the scanning rule includes: scanning and analyzing the data source in a scanning unit of n paragraphs, where n is a positive integer; or the scanning rule includes: first scanning and analyzing the data source in a scanning unit of m sentences, and then scanning and analyzing the data source in a scanning unit of n paragraphs, where m and n are positive integers; or the scanning rule includes: first scanning and analyzing the data source in a scanning unit of n paragraphs, and then scanning and analyzing the data source in a scanning unit of m sentences, where m and n are positive integers. The scanning unit may be preset, or may be obtained by selection of the user from one or more scanning units. The processing device supports in analyzing the data source by using one or more scanning units, so that the privacy data can be flexibly obtained. Particularly, when a scanning unit is at least two sentences, association between a data subject and privacy data that cross sentences can be implemented, to obtain richer privacy data. When a scanning unit is at least two paragraphs, association between a data subject and privacy data that cross paragraphs can be implemented, to obtain richer privacy data.

According to a second aspect, this disclosure provides a data masking apparatus. The data masking apparatus may include at least one module, and the at least one module may be configured to implement the data masking method according to the first aspect or various possible implementations of the first aspect.

According to a third aspect, this disclosure provides a computer device. The computer device includes a processor and a memory, the memory stores computer instructions, and the processor executes the computer instructions stored in the memory, to enable the computer device to perform the method according to the first aspect or various possible implementations of the first aspect, and enable the computer device to deploy the data masking apparatus according to the second aspect or various possible implementations of the second aspect.

According to a fourth aspect, this disclosure provides a computer-readable storage medium. The computer-readable storage medium stores computer instructions, and the computer instructions instruct a computer device to perform the method according to the first aspect or various possible implementations of the first aspect, or the computer instructions instruct the computer device to deploy the data masking apparatus according to the second aspect or various possible implementations of the second aspect.

According to a fifth aspect, this disclosure provides a computer program product. The computer program product includes computer instructions, and the computer instructions are stored in a computer-readable storage medium. A processor of a computer device may read the computer instructions from the computer-readable storage medium. The processor executes the computer instructions, to enable the computer device to perform the method according to the first aspect or various possible implementations of the first aspect, and enable the computer device to deploy the data masking apparatus according to the second aspect or various possible implementations of the second aspect.

According to a sixth aspect, this disclosure provides a chip. The chip may include a programmable logic circuit and/or program instructions. When the chip runs, the chip is configured to implement the data masking method according to any one of the first aspect.

In the data masking method provided in embodiments of this disclosure, masking processing is performed on target relational data in a data source based on the target relational data selected by a user, to effectively exclude data that does not need to be masked, and implement flexible masking of data in the data source. In addition, at least one group of relational data is displayed, so that the user can accurately select a to-be-masked object, thereby improving masking accuracy.

Privacy data in the data source is scattered and isolated in the data source. When one or more groups of relational data are obtained from the data source (for example, obtained by using a relationship extraction technology), because the relational data includes a data subject, privacy data, and a relationship between the data subject and the privacy data, the privacy data is associated with the data subject. The user can more intuitively discover, by using the one or more groups of relational data, the privacy data associated with the data subject, and the privacy data is no longer scattered and isolated data, so that the user can more accurately perform masking processing on the relational data.

In addition, in the data masking method provided in embodiments of this disclosure, a plurality of types of masking targets are provided, thereby enriching the types of the masking targets, and meeting masking requirements of different users. Particularly, when a masking target includes the data subject, the privacy data, and the relationship that the data subject and privacy data meet, associated data of the data subject in the data source can be comprehensively masked, thereby effectively improving data masking experience.

BRIEF DESCRIPTION OF DRAWINGS

FIG. 3 is a schematic diagram of a data asset interface according to an embodiment of this disclosure.

FIG. 4 is a schematic diagram of a user interface according to an embodiment of this disclosure.

FIG. 5 is a schematic diagram of another user interface according to an embodiment of this disclosure.

FIG. 6 is a schematic diagram of still another user interface according to an embodiment of this disclosure.

FIG. 9 is a schematic diagram of another user interface according to another embodiment of this disclosure.

DESCRIPTION OF EMBODIMENTS

To make principles and technical solutions of this disclosure clearer, the following further describes implementations of this disclosure in detail with reference to the accompanying drawings.

Figure 1:
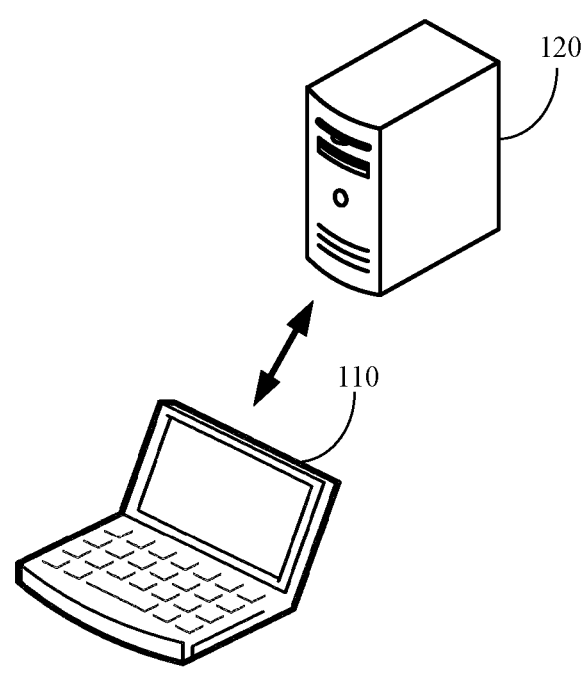
FIG. 1 is a schematic diagram of an application environment related to a data masking method according to an embodiment of this disclosure.

FIG. 1 is a schematic diagram of an application environment related to a data masking method according to an embodiment of this disclosure. Refer to FIG. 1, the application environment includes a terminal 110 and a processing device 120.

The terminal 110 may be a display, a computer, a smartphone, a tablet computer, a laptop portable computer, or the like. The processing device 120 may be a server, a server cluster including several servers, or another computer device. The terminal 110 establishes a wired or wireless communication connection to the processing device 120.

The terminal is used as a foreground, to present data to a user, and receive data input by the user, to implement interaction with the user. The server is used as a background, to perform data interaction with a foreground, and perform data processing in a data source, for example, masking processing. For example, a client, a script, or a browser may be installed in the terminal 110 to implement a foreground function. Correspondingly, a user interface of the terminal 110 may be presented in a form of a client interface, a terminal interface, or a web page corresponding to the browser. In a subsequent embodiment, that the processing device displays a piece of data means that the processing device displays the data through a user interface of the terminal.

In an optional implementation, the foregoing application environment is a cloud computing system. The processing device 120 is a cloud storage device, the cloud storage device stores a data source, and the data source may be used for cloud computing.

In another optional implementation, the foregoing application environment is a data analysis system. The application environment may further include a data analysis device, and the data analysis device is configured to analyze data in a data source. Optionally, the data analysis device may be integrated into the processing device 120. The processing device may provide a data source obtained through masking processing for the data analysis device.

In still another optional implementation, the foregoing application environment is a data sharing system. In this case, there are a plurality of terminals in the application environment, and the processing device 120 may share, under triggering of a user of one terminal, a data source obtained through masking processing with one or more other terminals.

There may be another case in the foregoing application environment. In this embodiment of this disclosure, the foregoing examples are merely used for description, and an application environment related to a data masking method is not limited.

Figure 2:
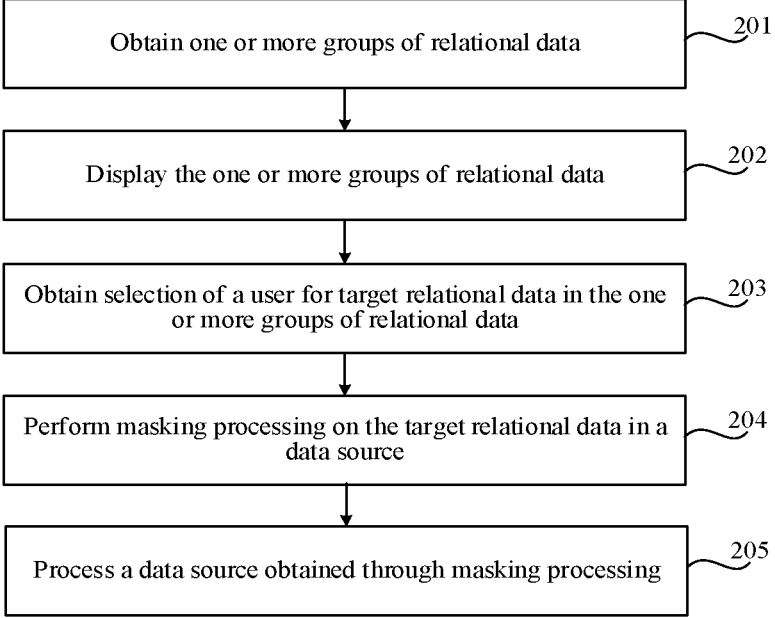
FIG. 2 is a flowchart of a data masking method according to an embodiment of this disclosure.

FIG. 2 is a flowchart of a data masking method according to an embodiment of this disclosure. The method may be performed by the processing device shown in FIG. 1, and the method includes the following steps.

S201: Obtain one or more groups of relational data.

The relational data includes a data subject, privacy data, and a relationship that the data subject and the privacy data meet. The data subject is an object that has data information, for example, a natural person who has personal data. The data subject has the right to protect his/her data information. The privacy data is also referred to as sensitive data, and is data that a data subject needs to be protected. The privacy data in the relational data is associated with the data subject. Therefore, it may be considered that the privacy data belongs to the data subject. For example, the privacy data is a mobile phone number, an identity card number, a bank card number, an employee card number, a birthday, an email address, or the like. There may be a plurality of character types of the privacy data, which may include, for example, a Chinese character, an English character, and/or a numeric character.

There may be a plurality of obtaining manners of the foregoing one or more groups of relational data. In embodiments of this disclosure, the following several obtaining manners are used as examples for description.

In a first obtaining manner, manually input one or more groups of relational data are obtained.

For example, a terminal provides a relational data input interface through a user interface, and a user inputs the one or more groups of relational data through the relational data input interface. The terminal sends the one or more groups of relational data to the processing device, for the processing device to receive the one or more groups of relational data.

In a second obtaining manner, the processing device obtains one or more groups of relational data from a data source.

The data source may be a data source specified by a user, or may be a data source that the processing device is allowed to access. There may be a plurality of storage types of the data source. The storage type is a type of a storage medium in which the data source is located. For example, the storage type may be an object storage service (OBS) type, a relational database service (RDS) type, a big data type, a code library type, or another database type. There may be a plurality of storage formats of the data source. For example, the data source may be stored in an unstructured text format or a structured text format. There may be a plurality of forms of the data source. Generally, a form of the data source is a file form. There may be a plurality of character types corresponding to the data source, which may include, for example, a Chinese character, an English character, and/or a numeric character.

When the data source is the data source specified by the user, the processing device may present a data asset interface of the user through the terminal. The data asset interface includes information about one or more digital assets owned by the user. The user selects, on the data asset interface, a data source from which relational data needs to be obtained. After the user selects the data source, the processing device determines that the data source is a data source that is authorized by the user and that can be analyzed. FIG. 3 is a schematic diagram of a data asset interface according to an embodiment of this disclosure. As shown in FIG. 3, an asset list of a user includes four types of data assets: an OBS type, an RDS type, a big data type, and a code library type. In FIG. 3, asset names of data assets of the OBS type of the user are "AAA" to "DDD" respectively, and a data asset indicated by each asset name may be a data source. In FIG. 3, an example in which data in the asset list is measured in buckets for storage is used, but a storage unit of the data is not limited.

A data source whose asset name is "AAA" is used as an example. For information about other data sources, refer to information about the data source whose asset name is "AAA". A bucket name of a bucket to which the data source belongs is "000". A bucket type is private. The data source whose asset name is "AAA" is stored in Ulanqab, North China, and creation time is 10:23:00 on Jul. 12, 2019. The processing device configures an operation control for the data source, where the operation control includes a selection control. When the user triggers a selection control corresponding to a data source, the processing device determines that the data source is the data source specified by the user. In FIG. 3, an example in which the operation control includes the selection control is used. In actual implementation, the operation control may further include another control, for example, a deletion control. A type of the operation control is not limited in this embodiment of this disclosure.

The processing device supports the user in specifying one or more data sources for simultaneous analysis. When the user specifies a plurality of data sources, cross-data source data processing can be implemented in a subsequent process. For example, masking processing of target relational data can be implemented.

Optionally, the processing device further supports a management operation of the user for a data asset. For example, a bucket adding operation is supported. In FIG. 3, the data asset interface further includes a control for adding a self-owned bucket and a control for adding another bucket, for the user to trigger a corresponding control to add a corresponding type of bucket.

After obtaining the data source, the processing device obtains the one or more groups of relational data from the data source. The process may include the following steps.

A1: Obtain a data subject.

In a first optional implementation, the processing device automatically obtains the data subject. In an optional example, the processing device obtains a preset data subject, for example, a data subject configured by an administrator, or a data subject pre-delivered by a management device to the processing device. In another optional example, the processing device obtains a data subject from a specified data source based on a preset rule. The preset rule includes one or more of the following: obtaining a Chinese name of a natural person in a specified data source as the data subject; obtaining an English name of the natural person in the specified data source as the data subject; and obtaining a nickname of the natural person in the specified data source as the data subject. The preset rule may alternatively be in another manner. This is not limited in embodiments of this disclosure. In still another optional example, the processing device obtains a data subject from a specified data source based on a privacy data discovery technology. The specified data source may be the foregoing data source from which the relational data needs to be extracted or a data source associated with the foregoing data source from which the relational data needs to be extracted. For example, the foregoing data source from which the relational data needs to be extracted is a data source X, and a data source associated with the data source X is a data source Y. In this case, the specified data source may be the data source X or the data source Y. The privacy data discovery technology includes one or more of a regular expression technology, a keyword extraction technology, and an NLP technology. In yet another optional example, the processing device receives a keyword input by the user, and obtains a data subject from a specified data source based on the keyword.

Because the data subject is automatically obtained by the processing device, user operations can be effectively reduced, and operation complexity can be reduced.

It should be noted that, when obtaining the data subject from the specified data source, the processing device may analyze the specified data source based on a scanning rule, to obtain the data subject. In an optional manner, the scanning rule includes: scanning and analyzing the specified data source in a scanning unit of m sentences, where m is a positive integer; or the scanning rule includes: scanning and analyzing the specified data source in a scanning unit of n paragraphs, where n is a positive integer; or the scanning rule includes: first scanning and analyzing the specified data source in a scanning unit of m sentences, and then scanning and analyzing the specified data source in a scanning unit of n paragraphs, where m and n are positive integers; or the scanning rule includes: first scanning and analyzing the specified data source in a scanning unit of n paragraphs, and then scanning and analyzing the specified data source in a scanning unit of m sentences, where m and n are positive integers. The scanning unit may be preset, or may be obtained by selection of the user from one or more scanning units. The processing device supports in analyzing the specified data source by using one or more scanning units, so that the data subject can be flexibly analyzed.

In a second optional implementation, a manually input data subject is obtained.

In an optional example, the processing device displays one or more data subjects in the data source from which the relational data needs to be extracted, and obtains a data subject selected by the user from the one or more data subjects. In this way, the processing device displays the one or more data subjects for the user to select, so that efficiency of inputting the data subject by the user can be improved.

For example, the processing device displays, through the user interface of the terminal, controls corresponding to the one or more data subjects, and the user triggers a control corresponding to the selected data subject. Correspondingly, the terminal receives a selection instruction, and transmits, to the processing device, a data subject indicated by the selection instruction as the data subject selected by the user.

Optionally, the processing device may further display a confidence of the one or more data subjects through the user interface of the terminal, where the confidence reflects credibility of the data subject in the data source, and the confidence is a reference for the user to select the required data subject. For example, a confidence of each data subject is determined based on one or more of a quantity of occurrences of the data subject, an occurrence frequency, and a context in the data source. Generally, the confidence of the data subject is positively correlated with the quantity of occurrences, in other words, more occurrences of the data subject in the data source indicate a higher confidence. The confidence of the data subject is positively correlated with the occurrence frequency, in other words, a higher occurrence frequency in the data source indicates a higher confidence.

FIG. 4 is a schematic diagram of a user interface according to an embodiment of this disclosure. In FIG. 4, three types of data sources: an OBS type, an RDS type, and a big data type, are displayed on the user interface. In FIG. 4, data subject names in data sources of the OBS type are "Wu WANG", "Liu ZHAO", "San ZHANG", and "Si LI" respectively. A data subject whose data subject name is "San ZHANG" is used as an example. For information about other data subjects, refer to information about the data subject whose data subject name is "San ZHANG". A name of a data source to which the data subject belongs is "AAA", a total quantity of occurrences in the data source AAA is 20, a data subject confidence is 98%, and previous identification time is 10:23:00 on Jul. 12, 2019. The processing device configures an operation control for the data subject, where the operation control includes a selection control. When the user triggers a selection control corresponding to a data subject, the processing device determines that the data subject is the data subject selected by the user. In FIG. 4, an example in which the operation control includes the selection control is used. In actual implementation, the operation control may further include another control, for example, a details control. A type of the operation control is not limited in this embodiment of this disclosure.

In another optional example, the processing device displays one or more data subjects in the data source from which the relational data needs to be extracted, and obtains a new data subject input by the user. For example, the processing device displays, through the user interface of the terminal, controls corresponding to the one or more data subjects, and displays a data subject input box. If the one or more data subjects do not include a data subject that the user needs to select, the user inputs a data subject through the data subject input box. Correspondingly, the terminal receives the data subject through the data subject input box, and transmits the received data subject to the processing device. In this way, when displaying the one or more data subjects for the user to select, the processing device may further receive the new data subject input by the user, to support the user in selecting two data subject input manners: inputting the data subject, and directly inputting the new data subject, thereby enriching operation manners of the user. In addition, due to diversity of data subjects, the processing device may not be able to exhaust data subjects required by the user. By independently inputting a data subject by the user, it can be ensured that the obtained data subject is the data subject required by the user.

FIG. 5 is a schematic diagram of another user interface according to an embodiment of this disclosure. For a manner of displaying controls corresponding to one or more data subjects in FIG. 5, refer to FIG. 4. On the basis, a data subject input box 30, corresponding prompt information, and a determining control are further displayed on the user interface. After the user inputs a data subject through the data subject input box 30 and triggers the determining control, the terminal receives the data subject through the data subject input box 30, and transmits the data subject to the processing device.

In still another optional example, the processing device directly obtains a new data subject input by the user. For example, the processing device displays a data subject input box through the user interface of the terminal. The user inputs a data subject through the data subject input box. Correspondingly, the terminal receives the data subject through the data subject input box, and transmits the received data subject to the processing device. In this way, the processing device enables, through a data subject input box, the user to directly input the data subject, so that accuracy of inputting the data subject by the user can be improved. For a function of the data subject input box, refer to a function of the data subject input box 30 in FIG. 5.

It may be understood that, in the second optional implementation of step A1, if the processing device displays the one or more data subjects in the data source, for an obtaining manner of each data subject in the one or more data subjects, refer to the obtaining manner in the first optional implementation of step A1. Details are not described in this embodiment of this disclosure.

Generally, the obtained data subject is a user or a person associated with the user.

A2: Obtain a relationship.

In a first optional implementation, the processing device automatically obtains the relationship. In an optional example, the processing device obtains a preset relationship, for example, a relationship configured by an administrator, or a relationship pre-delivered by a management device to the processing device. In another optional example, the processing device obtains a relationship from a specified data source based on a preset relationship rule. The preset relationship rule includes one or more of the following: obtaining a Chinese name of a natural person in a specified data source as the relationship; obtaining an English name of the natural person in the specified data source as the relationship; and obtaining a nickname of the natural person in the specified data source as the relationship. The preset relationship rule may alternatively be in another manner. This is not limited in embodiments of this disclosure. In still another optional example, the processing device obtains a relationship from a specified data source based on a privacy data discovery technology. The specified data source may be the foregoing data source from which the relational data needs to be extracted or a data source associated with the foregoing data source from which the relational data needs to be extracted. For example, the foregoing data source from which the relational data needs to be extracted is a data source X, and a data source associated with the data source X is a data source Y. In this case, the specified data source may be the data source X or the data source Y.

Because the relationship is automatically obtained by the processing device, user operations can be effectively reduced, and operation complexity can be reduced.

In a second optional implementation, a manually input relationship is obtained.

In an optional example, the processing device displays one or more relationships in the data source from which the relational data needs to be extracted, and obtains a relationship selected by the user from the one or more relationships. In this way, the processing device displays the one or more relationships for the user to select, so that efficiency of inputting the relationship by the user can be improved.

For example, the processing device displays, through the user interface of the terminal, controls corresponding to the one or more relationships, and the user triggers a control corresponding to the selected relationship. Correspondingly, the terminal receives a selection instruction, and transmits, to the processing device, a relationship indicated by the selection instruction as the relationship selected by the user. FIG. 6 is a schematic diagram of still another user interface according to an embodiment of this disclosure. In FIG. 6, a preset relationship set is displayed on the user interface, and the relationship set includes one or more relationships. Relationship names are "Relationship 1", "Relationship 2", and "Relationship 3" respectively. A relationship whose relationship name is "Relationship 1" is used as an example. For information about another relationship, refer to information about the relationship whose relationship name is "Relationship 1". A relationship description of Relationship 1 is as follows: Match a parent-child relationship. Example matching information is "A is a father of B". The processing device configures an operation control for the relationship, where the operation control includes a selection control. When the user triggers a selection control corresponding to a relationship, the processing device determines that the relationship is the relationship selected by the user.

In FIG. 6, an example in which the operation control includes the selection control is used. In actual implementation, the operation control may further include another control, for example, a details control or a remove control. A type of the operation control is not limited in this embodiment of this disclosure. It may be understood that, a relationship description of a relationship in FIG. 6 is for explaining a meaning of the relationship. Example matching information of a relationship is an example of an actual presentation form of the relationship, in other words, the relationship is actually presented in a manner of the example matching information. Both the relationship description and matching information. Both the relationship description and the example matching information are for explaining the relationship, so that the user can clearly understand the meaning of the relationship.

In another optional example, the processing device displays one or more relationships in the data source from which the relational data needs to be extracted, and obtains a new relationship input by the user. For example, the processing device displays, through the user interface of the terminal, controls corresponding to the one or more relationships, and displays a relationship input box. If the one or more relationships do not include a relationship that the user needs to select, the user inputs a relationship through the relationship input box. Correspondingly, the terminal receives the relationship through the relationship input box, and transmits the received relationship to the processing device. In this way, when displaying the one or more relationships for the user to select, the processing device may further receive the new relationship input by the user, to support the user in selecting two relationship input manners: inputting the relationship, and directly inputting the new relationship, thereby enriching operation manners of the user. In addition, due to diversity of relationships, the processing device may not be able to exhaust relationships required by the user. By independently inputting a relationship by the user, it can be ensured that the obtained relationship is the relationship required by the user.

Figure 7:
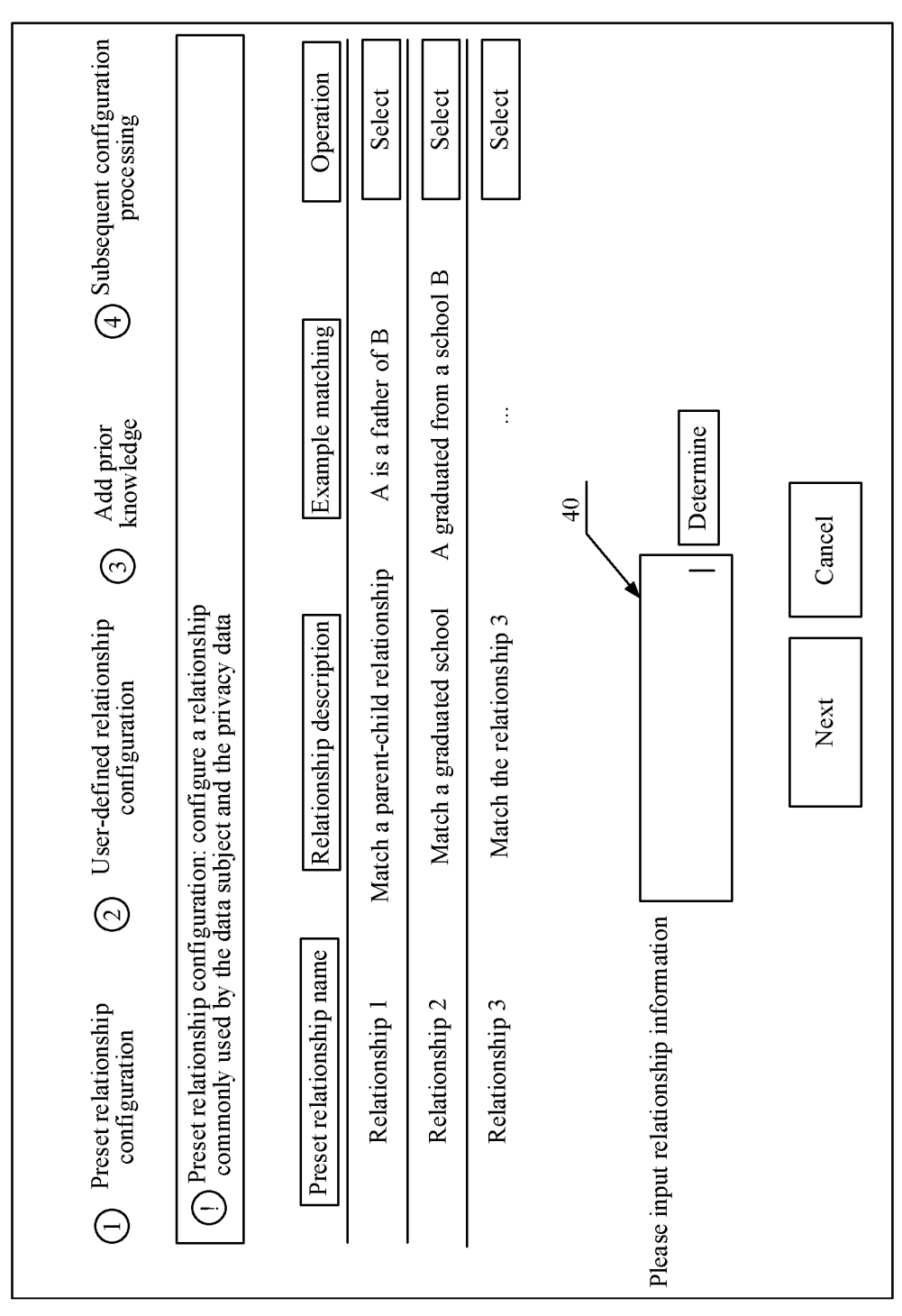
FIG. 7 is a schematic diagram of yet another user interface according to an embodiment of this disclosure.

FIG. 7 is a schematic diagram of yet another user interface according to an embodiment of this disclosure. For a manner of displaying controls corresponding to one or more relationships in FIG. 7, refer to FIG. 6. On the basis, a relationship input box 40, corresponding prompt information, and a determining control are further displayed on the user interface. After the user inputs a relationship through the relationship input box 40 and triggers the determining control, the terminal receives the relationship through the relationship input box 40, and transmits the relationship to the processing device. The relationship input box 40 is for inputting information of the relationship. The information includes a relationship name and a relationship rule, and may further include a relationship description and/or example matching information.

It may be understood that, the relationship rule input by the user is input in a form of a program language supported by the processing device. Optionally, the relationship rule may be input in a form of a function template, and the function template is a function whose form meets a form supported by the processing device. The relationship rule may include one or more of the following: a sequence of the data subject and the privacy data, a quantity of characters spaced between the data subject and the privacy data, and a keyword between the data subject and the privacy data.

In still another optional example, the processing device directly obtains a new relationship input by the user. For example, the processing device displays a relationship input box through the user interface of the terminal. The user inputs a relationship through the relationship input box. Correspondingly, the terminal receives the relationship through the relationship input box, and transmits the received relationship to the processing device. In this way, the processing device enables, through a relationship input box, the user to directly input the relationship, so that accuracy of inputting the relationship by the user can be improved. For a function of the relationship input box, refer to a function of the relationship input box 40 in FIG. 7.

When the processing device supports the user in inputting a relationship through the relationship input box, due to various forms of the relationship, to ensure that the processing device supports a relationship in a form input by the user, the processing device may display prompt information, to prompt the user to input a relationship that meets a form supported by the processing device.

Figure 8:
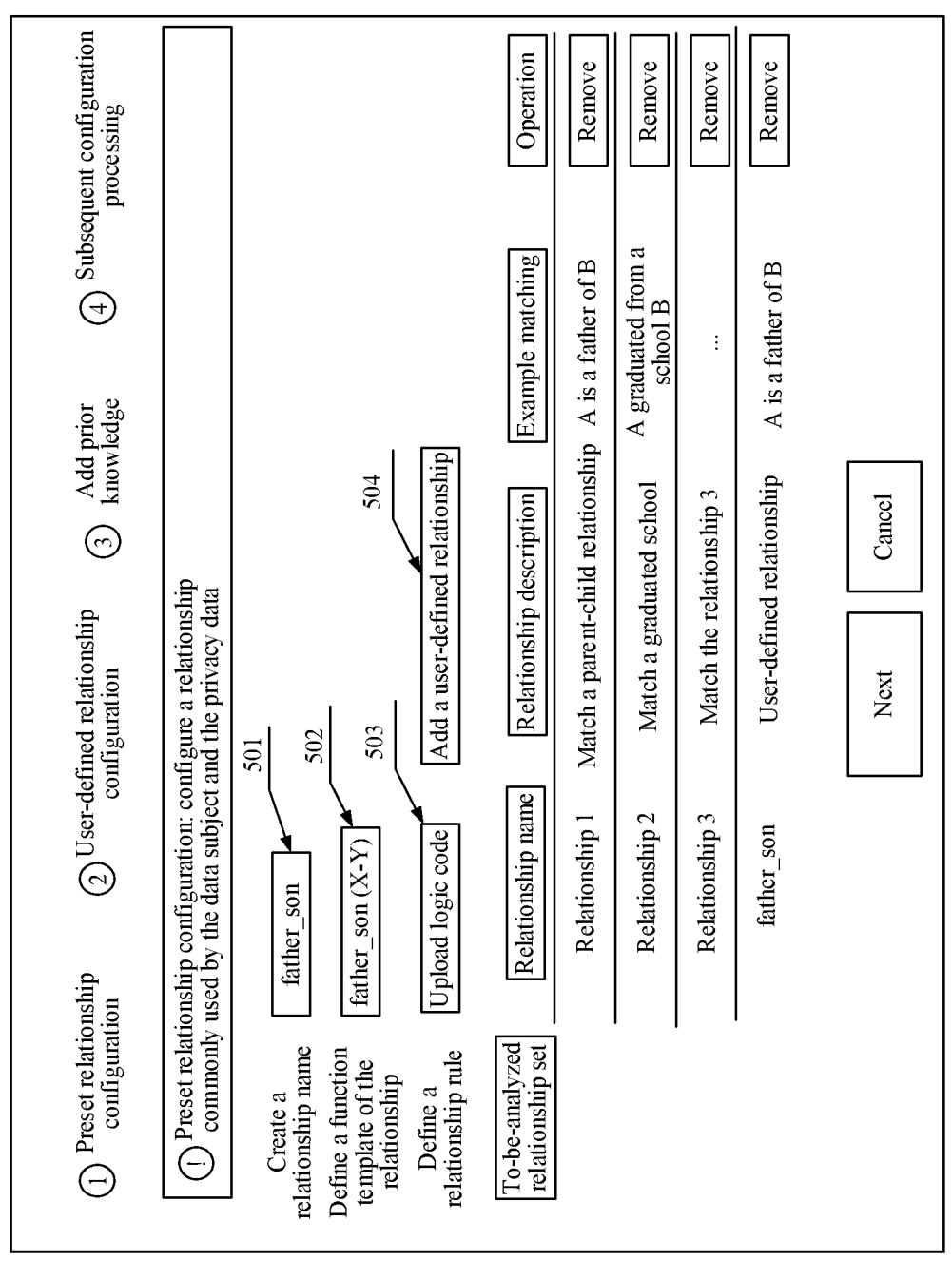
FIG. 8 is a schematic diagram of a user interface according to another embodiment of this disclosure.

FIG. 8 is a schematic diagram of a user interface according to another embodiment of this disclosure. In FIG. 8, a name input box 501, a function template input box 502, a code input control 503, and a user-defined relationship adding control 504 are displayed on the user interface. The name input box 501 is for inputting a relationship name; the template input box 502 is for inputting a function template of a relationship; the code input control 503 is for uploading logic code of the relationship; and the user-defined relationship adding control 504 is for determining the relationship that is submitted and input. The function template is a logical framework used by the relationship rule, and is equivalent to a summary of content of the relationship rule. A form of the function template meets a function in a form supported by the processing device. The logic code of the relationship is a relationship rule obtained through encoding by using a programming language.

For example, the user inputs a relationship name father_son through the name input box 501, and inputs a function template father_son (X, Y) through the function template input box 502, which indicate that content of a relationship rule is: X is a son of Y. The logic code described by using the programming language is input by using the code input control 503, where the code may be for describing at least one of the following rules: an occurrence sequence of X and Y; a name of another person cannot appear between X and Y; keywords that may appear between X and Y, for example, "father is", "son is", and "son of"; and a quantity of occurrences of keywords between X and Y is specified. After the relationship name, the function template, and the logic code are completely input, the user clicks the user-defined relationship adding control 504 to complete submission of the relationship.

It may be understood that, in the second optional implementation of step A2, the relationship selected by the user and/or the relationship input by the user may be presented in a manner of a to-be-analyzed relationship set shown in FIG. 8. In addition, in the second optional implementation of step A2, if the processing device displays the one or more relationships in the data source, for an obtaining manner of each relationship in the one or more relationships, refer to the first optional implementation of step A2. Details are not described in this embodiment of this disclosure.

A3: Obtain, from the data source, privacy data that meets the obtained relationship with the obtain data subject, where the obtained data subject, the obtained privacy data, and the obtained relationship form the relational data.

The processing device may obtain one or more data subjects, and may also obtain one or more relationships. The processing device obtains corresponding privacy data based on the obtained one or more data subjects and one or more relationships. When obtaining the privacy data from the data source, the processing device may analyze the data source based on a scanning rule, to obtain the privacy data. In an optional manner, the scanning rule includes: scanning and analyzing the data source in a scanning unit of m sentences, where m is a positive integer; or the scanning rule includes: scanning and analyzing the data source in a scanning unit of n paragraphs, where n is a positive integer; or the scanning rule includes: first scanning and analyzing the data source in a scanning unit of m sentences, and then scanning and analyzing the data source in a scanning unit of n paragraphs, where m and n are positive integers; or the scanning rule includes: first scanning and analyzing the data source in a scanning unit of n paragraphs, and then scanning and analyzing the data source in a scanning unit of m sentences, where m and n are positive integers. The scanning unit may be preset, or may be obtained by selection of the user from one or more scanning units.

The processing device supports in analyzing the data source by using one or more scanning units, so that the privacy data can be flexibly obtained. Particularly, when a scanning unit is at least two sentences, association between a data subject and privacy data that cross sentences can be implemented, to obtain richer privacy data. When a scanning unit is at least two paragraphs, association between a data subject and privacy data that cross paragraphs can be implemented, to obtain richer privacy data.

In a first optional implementation, for each data subject in the one or more data subjects, the processing device separately obtains privacy data that meets each relationship in the obtained one or more relationships with the data subject, to obtain one or more pieces of privacy data. Each relational data is formed by a data subject, one piece of privacy data, and a relationship that the data subject and the privacy data meet. For example, there are two obtained data subjects: "San ZHANG" and "Si LI". There are two obtained relationships: <S, Rfather, E> and born (E1, E2). <S, Rfather, E> indicates that a father of S is E1, S is a data subject, and E is privacy data. born (E1, E2) indicates that a birthday of E1 is E2, E1 is a data subject, and E2 is privacy data. For the data subject "San ZHANG", the processing device obtains privacy data "Wu ZHANG" that meets the relationship <S, Rfather, E> with San ZHANG. In this case, it indicates that a father of San ZHANG is Wu ZHANG. "San ZHANG", <S, Rfather, E>, and "Wu ZHANG" form one piece of relational data. In addition, the processing device obtains privacy data "Oct. 2, 1987" that meets the relationship born (E1, E2) with San ZHANG. In this case, it indicates a birthday of San ZHANG is Oct. 2, 1987. "San ZHANG", "born (E1, E2)", and "Oct. 2, 1987" form one piece of relational data. Similarly, for an obtaining manner of relational data corresponding to Si LI, refer to an obtaining manner of the relational data corresponding to San ZHANG.

In a second optional implementation, for each relationship in one or more relationships, the processing device separately obtains privacy data that meets the relationship with each data subject in the one or more data subjects, to obtain one or more pieces of privacy data. Each relational data is formed by a data subject, one piece of privacy data, and a relationship that the data subject and the privacy data meet. The example in the first optional implementation is still used as an example. For a relationship: <S, Rfather, E>, the processing device obtains privacy data "Wu ZHANG" that meets the relationship <S, Rfather, E> with San ZHANG. In this case, it indicates that a father of San ZHANG is Wu ZHANG. "San ZHANG", <S, Rfather, E>, and "Wu ZHANG" form one piece of relational data. In addition, the processing device obtains privacy data "Liu LI" that meets the relationship <S, Rfather, E> with Si LI. In this case, it indicates that a father of Si LI is Liu LI. "Si LI", <S, Rfather, E>, and "Liu LI" form one piece of relational data. Similarly, for an obtaining manner of relational data corresponding to born (E1, E2), refer to an obtaining manner of the relational data corresponding to <S, Rfather, E>.

In step A3, the privacy data that meets the obtained relationship with the obtained data subject may be obtained by using a relationship extraction technology, for example, may be obtained by using a relationship extraction technology (also referred to as an association analysis technology)

of Deepdive (an open-source knowledge extraction system). Assuming that an obtained data subject is S and an obtained relationship is Ri, the processing device analyzes a to-be-extracted relationship Ri based on the data subject S by using the relationship extraction technology, and constructs a triplet <S, Ri, E>, to indicate that there is the relationship Ri between S and E. E is privacy data that meets the relationship Ri with the data subject S. Correspondingly, relational data may also be indicated by the triplet. The processing device may deploy a relationship extraction engine to execute the relationship extraction technology.

It should be noted that, in step A3, an action of obtaining the privacy data may be automatically performed after the processing device obtains the data subject and the relationship, or may be performed by triggering of the user.

S202: Display the one or more groups of relational data.

The processing device may display the one or more groups of relational data through the user interface of the terminal. The one or more groups of relational data may be displayed in a form of a table or a relationship diagram, or may be displayed in a form of a knowledge graph (for example, a knowledge graph of Deepdive). The knowledge graph is a semantic network, to describe entities in an objective world and relationships between the entities. Because both the data subject and the privacy data in the relational data may be considered as entities, a form of the relational data is relatively consistent with the form of the knowledge graph. A structure of the relational data can be effectively described by using the knowledge graph, so that the user can intuitively view the relational data.

FIG. 9 is a schematic diagram of another user interface according to another embodiment of this disclosure. In FIG. 9, five groups of relational data are displayed on the user interface in a form of a table, and each group of relational data includes a data subject, privacy data, and a relationship. Optionally, the processing device supports a relational data screening function. The processing device receives a data subject input by the user, and displays, based on the data subject, relational data that includes the data subject in the one or more groups of relational data, to implement screening of the relational data required by the user. For example, a data subject name data box 60 may further be displayed on the user interface in FIG. 9. The data subject name data box 60 is used by the user to input a name of a data subject that needs to be screened, so that the processing device screens relational data.

Figure 10:
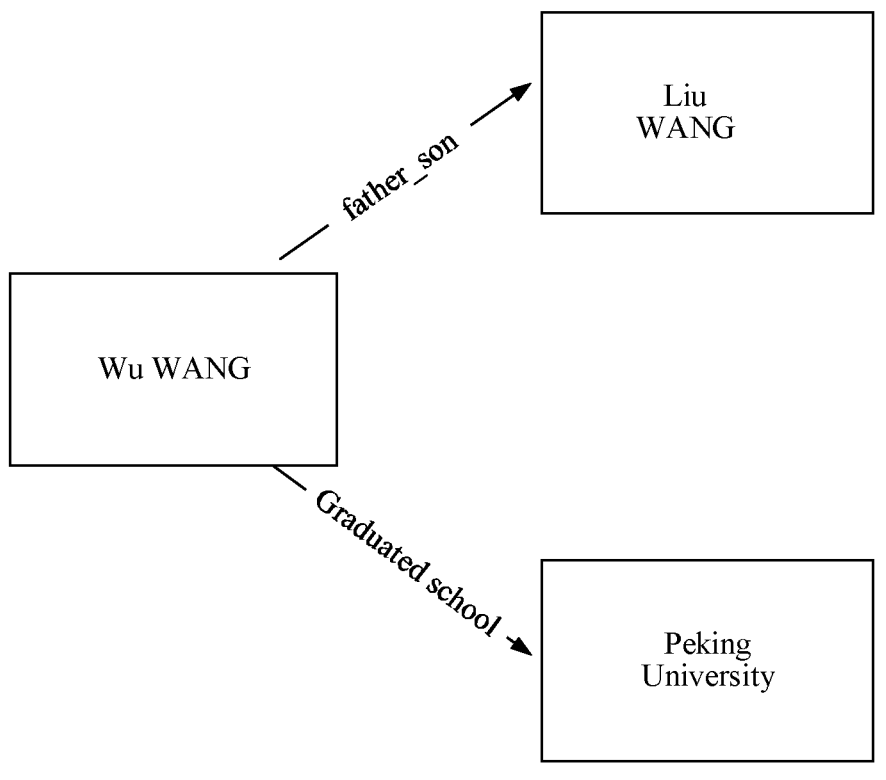
FIG. 10 is a schematic diagram of still another user interface according to another embodiment of this disclosure.

FIG. 10 is a schematic diagram of still another user interface according to another embodiment of this disclosure. In FIG. 10, two groups of relational data are displayed on the user interface in a form of a knowledge graph, and each group of relational data includes a data subject, privacy data, and a relationship. An arrow in FIG. 10 points from the data subject to the privacy data, to indicate that the privacy data is associated data of the data subject, in other words, the privacy data belongs to the data subject. Because data subjects of two groups of associated data are the same, in FIG. 10, the two groups of associated data share one data subject. In this way, a relationship between data subjects of different associated data is more vividly reflected.

Optionally, the processing device may further display related information of one or more pieces of relational data through the user interface of the terminal. As shown in FIG. 9, the related information may include one or more of previous association time, mark information, and a confidence. Previous association time corresponding to one piece of relational data indicates a time at which the relational data is obtained last time relative to current time of obtaining the relational data. Mark information indicates whether there is a false positive in the relational data. The processing device may determine, based on a false positive determining rule, whether there is a false positive in the relational data, and output the mark information based on a determining result. For example, the false positive determining rule includes: a confidence of the relational data is less than a preset confidence.

In one piece of relational data, a confidence of the relational data reflects credibility that a data subject and privacy data meet a relationship. Reliability of relational data with a high confidence is high, and reliability of relational data with a low confidence is low. The confidence is a reference for the user to select the target relational data for masking processing. The user may determine, by using the confidence, whether to select specific relational data as the target relational data for masking processing.

In a first optional manner, the processing device determines the confidence of the relational data based on a confidence obtaining rule. For example, a confidence of each relational data is determined based on one or more of a quantity of occurrences of the relational data, an occurrence frequency, and a context of one or more elements (namely, a data subject, privacy data, or a relationship) in the relational data in the data source. Generally, the confidence of the relational data is positively correlated with the quantity of occurrences, in other words, more occurrences of the data subject in the data source indicate a higher confidence. The confidence of the relational data is positively correlated with the occurrence frequency, in other words, a higher occurrence frequency in the data source indicates a higher confidence.

In a second optional manner, the processing device may determine the confidence based on prior knowledge of the relational data provided by the user. The prior knowledge of the relational data is known relational data. For example, the prior knowledge of the relational data includes: relational data reflecting a parent-child relationship, for example, <San ZHANG, Rfather, Wu ZHANG> and <Si LI, Rfather, Wu LI>. The confidence is determined combined with the prior knowledge, so that reliability of the determined confidence can be improved, and a probability of an omission or a false positive of the relational data can be reduced, so that the user can more accurately select the target relational data. As shown in FIG. 6 to FIG. 8, the processing device provides a prior knowledge input interface (namely, a control corresponding to "adding prior knowledge" in the figures), and the user selects whether to input the prior knowledge.

In a third optional manner, the processing device determines the confidence of the relational data based on a confidence obtaining rule and prior knowledge. For example, a first confidence is obtained based on the confidence obtaining rule, and a second confidence is obtained based on the prior knowledge. Then, weighted averaging is performed on the first confidence and the second confidence based on a set weight value, to obtain the confidence of the relational data.

In a fourth optional manner, the processing device may alternatively determine the confidence based on a factor graph. The confidence determined based on the factor graph has high accuracy. The factor graph is a probability graph, and the factor graph is an indication graph of function factor decomposition, which generally includes two types of nodes: variable nodes and function nodes. A variable node is for reflecting a probability that a specific event occurs. For example, in this embodiment of this disclosure, the variable node indicates a variable set x that affects whether a group of relational data is established, where the variable set x includes one or more variable elements. Each variable element affects whether the relational data is established.

For example, for relational data <S, Ri, E>, it indicates that there is a relationship Ri between a data subject S and privacy data E. The variable set x includes one or more of the following variable elements: a variable element indicating whether there is the data subject S (or a keyword associated with the data subject S) complying with the relationship Ri; and a variable element indicating whether there is a specific piece of privacy data complying with the relationship Ri. A function node defines a relationship between variable nodes, and may be considered as a probability function of the variable nodes. A function value of the function node is the confidence of the relational data. For example, the function node may be indicated as f(x), for example, f(x) indicates a weighted sum of the variable elements in the variable set x. Assuming that the variable set x includes three variable elements: x1, x2, and x3, the function node may be indicated as f(x1, x2, x3)=x1×w1+×2×w2+x3×w3, where w1, w2, and w3 are separately weight values of x1, x2, and x3. Optionally, the factor graph may be a factor graph provided by Deepdive.

It may be understood that, the fourth optional manner may be alternatively performed in combination with the first optional manner to the third optional manner. This is not limited in this embodiment of this disclosure.

It should be noted that, when displaying the one or more groups of relational data, the processing device may alternatively provide a trigger control, for example, a details control, of detailed information about the relational data for the user to trigger. After the user triggers the control, the processing device may display the detailed information about the relational data, for example, one or more of information of a data source path to which the relational data belongs, a data source name, and a location of the data subject in the data source.

Because the one or more groups of relational data in this embodiment of this disclosure relate to the privacy data, to effectively protect the privacy data, authentication may be performed on an operation user, and corresponding data is displayed after the authentication on the user passes. For example, the authentication operation may be performed before the data subject is obtained in step A1, before the relationship is obtained in A2, or before the one or more groups of relational data are displayed in step S202.

S203: Obtain selection of the user for target relational data in the one or more groups of relational data.

For example, the processing device displays, through the user interface of the terminal, controls corresponding to the one or more groups of relational data, and the user triggers a control corresponding to the selected relational data. Correspondingly, the terminal receives a selection instruction, and transmits, to the processing device, relational data indicated by the selection instruction as the target relational data selected by the user.

As shown in FIG. 9, on the user interface, a selection control corresponding to each group of relational data is displayed. After the user triggers a selection control of specific relational data, the processing device determines that the relational data corresponding to the selection control is the target relational data.

It should be noted that, if the processing device supports a knowledge graph function, after obtaining a plurality of pieces of relational data, the processing device may also perform knowledge reasoning based on the knowledge graph to obtain new relational data. Knowledge reasoning is a technology of making new conclusions by reasoning with known knowledge. Optionally, the processing device displays the new relational data obtained by performing knowledge reasoning based on the knowledge graph. For example, the new relational data may also be simultaneously displayed with other relational data. For differentiation, the new relational data may be displayed in a display manner different from those of the other relational data, for example, a highlighted display manner or an underlined display manner. In this way, the new relational data is a reference for the user to select new target relational data. For example, the new relational data is used as the new target relational data, or relational data similar to the new relational data in other relational data is used as the new target relational data. In addition, the new relational data may be used by the user to determine a new relationship. The new relationship may be used for next masking processing. To be specific, during next masking processing, the obtained relationship through step A2 may include the new relationship.

For example, it is assumed that known relational data <S, Rfather, E1> indicates that a father of S is E1, and known relational data son born(E1, E2) indicates that a birth date of a son of E1 is E2. The processing device may reason, by using a parent-child relationship and transitivity of the relationship, that a birth date of S is E2.

S204: Perform masking processing on the target relational data in the data source.

There may be a plurality of execution occasions of the masking processing. In an optional implementation, the masking processing is performed when being triggered by the user. The processing device provides a masking processing control, and starts to perform masking processing on the target relational data in the data source after detecting a trigger operation of the user for the masking processing control. In another optional implementation, the masking processing is performed after the data source reaches a specific condition. For example, after determining, from the data source stored in a cloud computing system, the target relational data that meets a data masking condition, the processing device performs masking processing on the target relational data in the data source. The data masking condition includes one or more of the following: the data subject in the target relational data reaches a deregistration condition; and storage duration of the target relational data reaches target duration.

There may be a plurality of manners in which the processing device performs masking processing on the target relational data in the data source. In embodiments of this disclosure, the following several manners are used as examples for description.

In a first masking manner, a masking target in the target relational data is obtained, and masking processing is performed on the masking target in the target relational data.

The masking target is one or more of the following: the data subject, the privacy data, and the relationship that the data subject and the privacy data meet. A type of a masking target in other data masking includes only privacy data. However, in the data masking method provided in embodiments of this disclosure, a plurality of types of masking targets are provided, thereby enriching the types of the masking targets, and meeting masking requirements of different users. Particularly, when a masking target includes the data subject, the privacy data, and the relationship that the data subject and privacy data meet, associated data of the data subject in the data source can be comprehensively masked, thereby effectively improving data masking experience.

In an optional manner, the processing device may directly obtain a preset masking target. For example, the masking target is the privacy data. In another optional manner, the processing device may obtain selection of the user for the masking target in the target relational data. For example, the processing device displays, through the user interface of the terminal, a control corresponding to each element in the target relational data, and the user triggers a control corresponding to the selected element. Correspondingly, the terminal receives a selection instruction, and transmits, to the processing device, an element indicated by the selection instruction as the masking target selected by the user. Elements of the target relational data generally include three elements: a data subject, privacy data, and a relationship that the data subject and the privacy data meet. By selecting the masking target by the user, masking processing can be targeted to perform on the target relational data in the data source, thereby improving accuracy of the masking processing.

The process of performing masking processing on the masking target in the target relational data may include: masking the masking target in the target relational data in the data source, where the masking includes: hash masking, cover masking, replacement masking, transform masking, encryption masking, or shuffle masking. The masking the masking target refers to masking a part or all of the masking target. The hash masking is an algorithm for performing masking by using a hash algorithm. For example, the hash algorithm includes: SHA-1, SHA-224, SHA-256, SHA-384, or SHA-512. The cover masking is an algorithm for covering characters that need to be masked. For example, if a character is covered by a wildcard character, the wildcard character may be an asterisk "*" or a question mark "?". The replace masking is an algorithm for replacing characters that need to be masked with masqueraded data.

For example, if the masking target is a person name, the person name is replaced with a random character string, for example, a random person name; or if the masking target is a relationship, the relationship is replaced with a random character string, for example, a random relationship. If attributes of characters before and after replacement are the same, for example, a person name is replaced with a random person name or a relationship is replaced with a random relationship, real data can be hidden on a premise that readability of a text in the data source is ensured. The transform masking is an algorithm for obtaining new characters by performing transform processing on characters that need to be masked. The encryption masking is an algorithm for encrypting characters that need to be masked. The shuffle masking is an algorithm for scrambling a sequence of characters that need to be masked.

It may be understood that, when the masking target includes a relationship, actual masked content in the data source is content presented in the relationship in plaintext. In an optional example, the content presented in the relationship in plaintext may be determined based on example matching information of the relationship. For example, the example matching information is a readable statement that is formed by an example of a data entity, an example of privacy data, and the content presented in the relationship in plaintext. In this case, the actual masked content is the content presented in the relationship in plaintext in the example matching information.

For example, the masking target is Relationship 1, a relationship description of Relationship 1 is as follows: match a parent-child relationship, and the example matching information is that "A is a father of B". In this case, content other than A and B in the example matching information, namely, both "is" and "father of", are content presented in the relationship in plaintext, namely, actual masked content corresponding to the relationship. For content that meets Relationship 1 in the data source: "Xiao Ming is a father of Xiao Bai", if a replacement masking algorithm is used for masking and the relationship is replaced with a random character string, a masking result may be "Xiao Ming, you, Xiao Bai, and the day". In this way, the relationship can be effectively hidden. If the replacement masking algorithm is used for masking and the relationship is replaced with a random relationship, a masking result may be that "Xiao Ming is a mother of Xiao Bai". In this way, the relationship can be effectively hidden while readability of a text in the data source is ensured.

Optionally, if the relationship is a relationship in new relational data obtained through knowledge reasoning, the data source may not have content directly presented in the relationship in plaintext, but has plaintext content of an indirect relationship for obtaining the relationship through reasoning. In this case, the plaintext content of the indirect relationship may be used as the actual masked content of the data source. For example, the masking target is Relationship 2: born (S, E2), to indicate that a birthday of S is E2, where Relationship 2 is obtained through knowledge reasoning. Refer to the example in S203. The indirect relationship of the relationship obtained through reasoning is as follows: a father of S is E1, a birth date of a son of E1 is E2, and corresponding plaintext content is "a father of is" and "a birth date of a son is". In this case, the actual masked content of the data source is "a father of is" and "a birth date of a son is".

In a second masking manner, a masking degree is obtained; and masking processing is performed on the target relational data in the data source based on the masking degree.

In an optional example of the second masking manner, the masking degree is for reflecting a proportion of a masked character to total characters of the target relational data. That masking processing is performed on the target relational data in the data source based on the masking degree means that after the masking processing, the proportion of the masked character to the total characters of the target relational data is equal to the masking degree. The masked character is a character that is masked through hash masking, cover masking, replacement masking, transform masking, encryption masking, or shuffle masking.

In an optional manner, the processing device may directly obtain a preset masking degree. For example, the masking degree is 50%. In another optional manner, the processing device may obtain selection of the user for the masking degree of the target relational data. For example, the processing device displays, through the user interface of the terminal, controls corresponding to one or more masking degrees (for example, 10%, 30%, 50%, or 100%) of the target relational data, and the user triggers a control corresponding to the selected masking degree. Correspondingly, the terminal receives a selection instruction, and transmits, to the processing device, a masking degree indicated by the selection instruction as the masking degree selected by the user. By selecting the masking degree by the user, masking processing can be flexibly performed on the target relational data in the data source, thereby implementing personalized masking.

In another optional example of the second masking manner, one or more elements in the target relational data correspond to a masking degree. Elements of the target relational data generally include three elements: a data subject, privacy data, and a relationship that the data subject and the privacy data meet. The masking degree of the element is for reflecting a proportion of a masked character in the element to total characters of the corresponding element. That masking processing is performed on the target relational data in the data source based on the masking degree means that after masking processing is performed on an element, a proportion of a masked character in the element to total characters of the element is equal to a masking degree of the element.

In an optional manner, the processing device may directly obtain a preset masking degree of an element. For example, the masking degree is 60%. In another optional manner, the processing device may obtain selection of the user for the masking degree of the target relational data. For example, the processing device displays, through the user interface of the terminal, controls corresponding to one or more masking degrees (for example, 10%, 30%, 50%, or 100%) of each element in the target relational data, and the user triggers a control corresponding to the selected masking degree. Correspondingly, the terminal receives a selection instruction, and transmits, to the processing device, a masking degree of an element indicated by the selection instruction as the masking degree of the element selected by the user.

It may be understood that, the foregoing two masking manners may be separately performed or may be performed in combination according to an actual situation. For example, the first masking manner and the second masking manner may be performed in combination. The processing device obtains the masking degree and the masking target in the target relational data, and performs masking processing on the masking target in the target relational data based on the masking degree.

In actual implementation, the processing device may further display one or more masking algorithms; and obtain a masking algorithm selected by the user from the one or more masking algorithms. In this way, the processing device displays the one or more masking algorithms for the user to select, so that efficiency of inputting the masking algorithm by the user can be improved.

Figure 11:
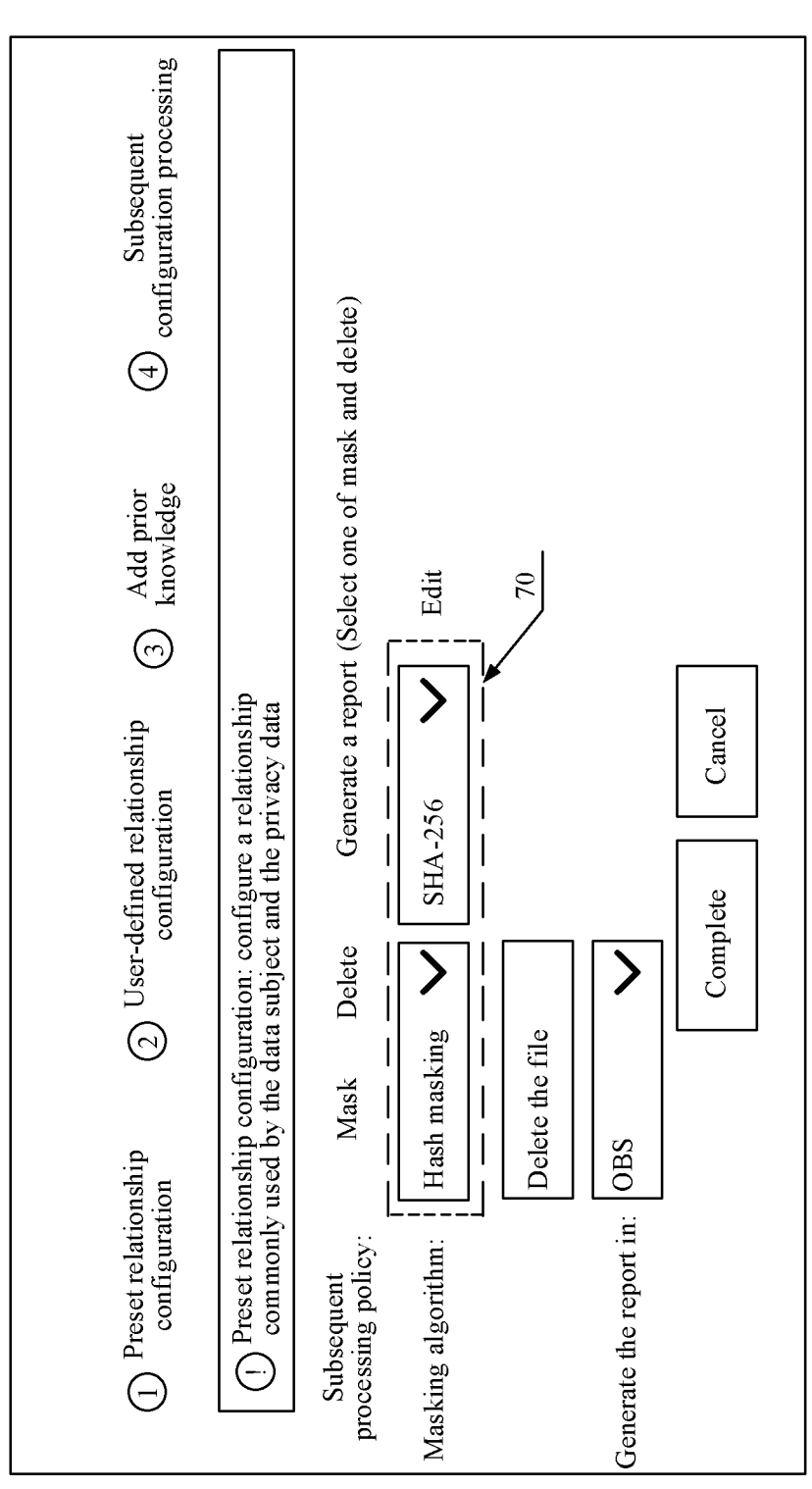
FIG. 11 is a schematic diagram of yet another user interface according to another embodiment of this disclosure.

FIG. 11 is a schematic diagram of yet another user interface according to another embodiment of this disclosure. In FIG. 11, a masking algorithm drop-down menu 701 is displayed on the user interface. The user may select a masking algorithm by using the masking algorithm drop-down menu 701. For example, the masking algorithm drop-down menu 701 includes options of one or more algorithms of hash masking, cover masking, replacement masking, transform masking, encryption masking, and shuffle masking. In FIG. 11, it is assumed that the user selects an SHA-256 algorithm in the hash masking algorithm.

S205: Process a data source obtained through masking processing.

The data masking method may be related to a plurality of application environments. In different application environments, a processing manner for the data source obtained through masking processing is different. In embodiments of this disclosure, the following several processing manners are used as examples for description.

In a first processing manner, the data source obtained through masking processing is stored. For example, the processing device may store the data source obtained through masking processing as a new data source. The data source before masking processing is deleted. For another example, the processing device may store the data source obtained through masking processing as a new data source.

The data source before masking processing is retained, but an access permission is set. For example, only an authorized user can access the data source. For example, when an application environment is a cloud computing system, the processing device may store the data source obtained through masking processing.

In a second processing manner, the data source obtained through masking processing is provided for a data analysis device. For example, when an application environment is a data analysis system, the processing device may provide the data source obtained through masking processing for the data analysis device.

In a third processing manner, the data source obtained through masking processing is shared. For example, when an application environment is a data analysis system, the processing device may share the data source obtained through masking processing.

It should be noted that, in embodiments of this disclosure, the processing device further supports another function. In an optional example, the processing device supports a data source deletion function. As shown in FIG. 11, it is assumed in FIG. 11 that a form of a data source is a file form, and the processing device displays a deletion control. After the user triggers the deletion control, the processing device deletes the data source in which the target relational data is located. In this way, a means of protecting the privacy data is provided for the user. If the user considers that the data source includes too much privacy data, the data source may be directly deleted. In another optional example, the processing device supports a generation function of an analysis report. The analysis report includes analysis information of the one or more groups of relational data and/or analysis information of the data source obtained through masking processing. As shown in FIG. 11, the processing device displays a location selection control. After the user selects a generation address by using the location selection control, the processing device generates an analysis report at the generation address. In FIG. 11, it is assumed that the user selects the generation address of the analysis report as a data source of an OBS type. In this way, the user can clearly understand a case of the relational data and/or a case of the data source obtained through masking processing.

Figure 12:
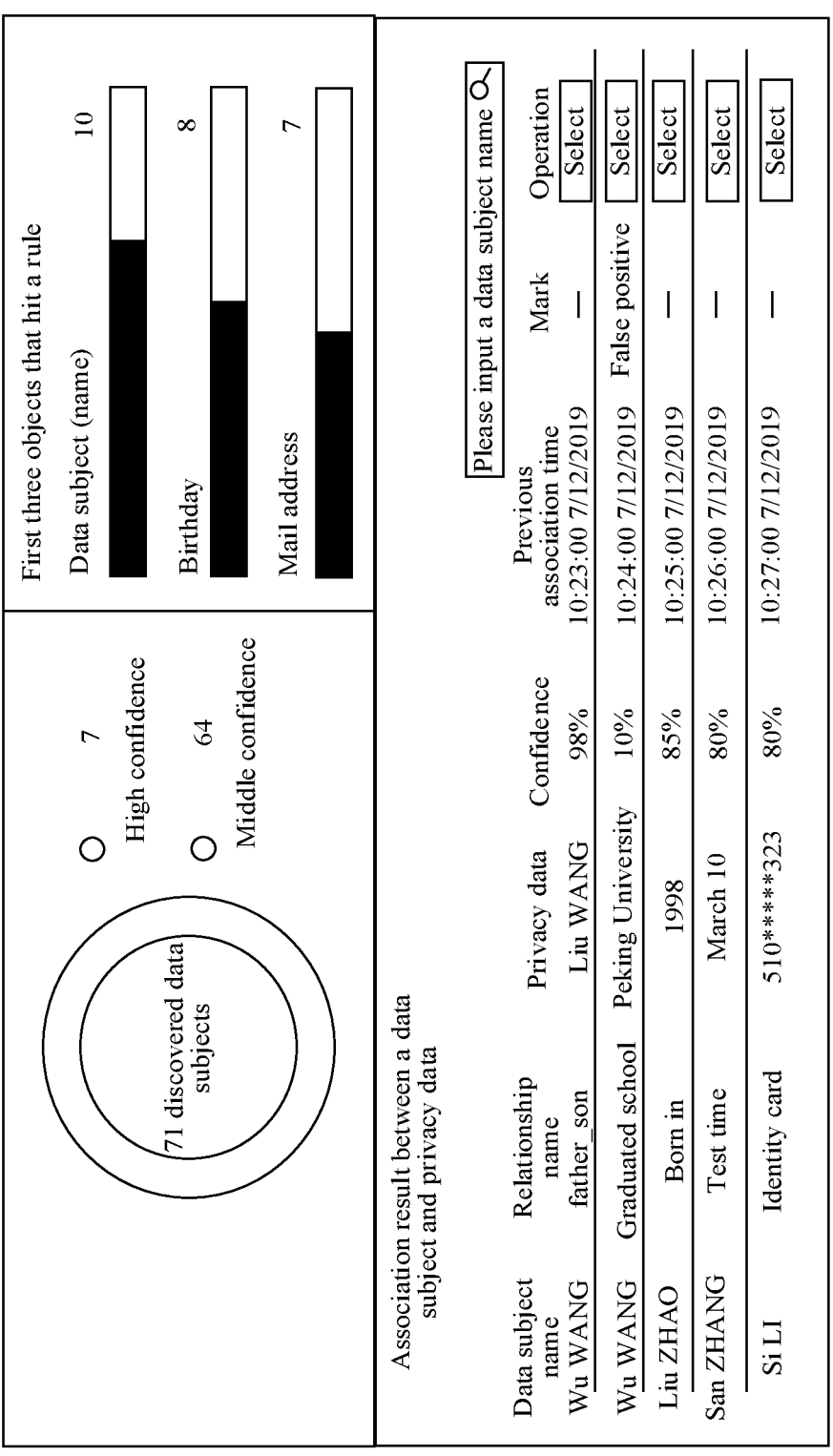
FIG. 12 is a schematic diagram of an analysis report according to an embodiment of this disclosure.

FIG. 12 is a schematic diagram of an analysis report according to an embodiment of this disclosure. Analysis information of one or more groups of relational data in the analysis report includes: the one or more groups of relational data (for content of the one or more groups of relational data, refer to FIG. 9), information about a data subject discovered in a data source in which the one or more groups of relational data are located, and information about an object that hits a rule in the data source in which the one or more groups of relational data are located. The information about the data subject may include a quantity of discovered data subjects (71 is used as an example in FIG. 12) and/or a quantity of data subjects with different confidences (in FIG. 12, an example in which a confidence of a data subject includes two levels: a high confidence level and a low confidence level is used). The object that hits the rule includes a data subject and/or privacy data obtained by a processing apparatus. In FIG. 12, it is assumed that the first three objects that hit the rule are a data subject (name), privacy data: a birthday, and privacy data: a mail address. The information about the object that hits the rule includes a name of the object and a quantity of objects. It should be noted that, the analysis report further includes other information. FIG. 12 is merely an example for description, which is not limited herein.

It should be noted that, the user interface displayed by the processing device through the terminal may further be in another form or include other information. For example, operation prompt information may further be displayed on the user interface, to prompt the user to perform a corresponding operation, thereby improving operation efficiency of the user. As shown in FIG. 6 to FIG. 9, the operation prompt information includes: "preset relationship configuration", "user-defined relationship configuration", "add prior knowledge", and "subsequent configuration processing", to prompt the user of an operation action and a sequence. The operation prompt information further includes explanation information of an operation, for example, "preset relationship configuration: configure a relationship commonly used by the data subject and the privacy data", so that the user can understand an actual meaning of each operation.

For ease of understanding, the following uses a specific example to describe the data masking method provided in embodiments of this disclosure. It is assuming that there are two data sources specified by a user: File 1 and File 2. Content of File 1 includes: A father of Xiaoyang ZHANG is a famous dress tailor Xiaohai ZHANG. File 2: Xiaohai ZHANG was born in Kowloon, Hong Kong, and ran his own dress shop when his son was born in December 1969.

When step A1 and step A2 are performed, it is assumed that a specified data source (namely, a data source from which a data subject needs to be obtained) and a data source from which relational data needs to be extracted are a same data source. In this case, the data source is scanned by using a sensitive data discovery technology, and the data subject and privacy data in the data source are obtained (namely, discovered) through analysis. For example, discovered data subjects include names (Xiaoyang ZHANG and Xiaohai ZHANG), and the privacy data includes a place of birth (Kowloon, Hong Kong), date of birth (December 1969), and disclosure, masking processing may be performed in a same data source, and cross-data source masking processing may also be performed.

It should be noted that, when executing the sensitive data discovery technology, a processing device may mark target data required for establishing a knowledge graph and a relationship extraction technology. For example, the target data may be an NLP annotation array, and the processing device may perform annotation by using an NLP technology. The NLP annotation array includes one or more of the following: arrays (tokens), a lemmatization array (lemmas), a part-of-speech array (pos_tags), a named entity annotation array (ner_tags), an offset array (doc_offsets), a syntax analysis dependent type array (dep_types), and a syntax analysis dependent word segmentation array (dep tokens). Such NLP annotation arrays are saved for construction of the knowledge graph and the relationship extraction technology.

The word segmentation array is an array obtained through word segmentation by using the NLP technology, and includes one or more characters. The lemmatization array is an array for restoring a tense to a present tense. The part-of-speech array is an array divided by part-of-speech, for example, a noun, a verb, or an adjective. The named entity annotation array is attribute information of an array, such as a name and an organization name. The offset array is an offset of an array in a file. The syntax analysis dependent type array is a type of an array in syntax, such as a subject, a predicate, or an object. The syntax analysis dependent word segmentation array is a dependency between an array and a sentence.

For example, Table 1 shows some content of the NLP annotation array. An NLP annotation array of File 1 in Table 1 is used as an example. The NLP annotation array indicates that arrays obtained by performing word segmentation on a first sentence of a file whose file identifier is 1 include: "Xiaoyang ZHANG", "of", "father", "is", "famous", "of", "dress", "tailor", and "Xiaohai ZHANG".

TABLE 1

| File identifier | Sentence identifier | Arrays |
|---|---|---|
| 1 | 1 | "Xiaoyang ZHANG", "of", "father", "is", "famous", "of", "dress", "tailor", and "Xiaohai ZHANG" |
| 2 | 1 | "Xiaohai ZHANG", "born in", "Hong Kong", "Kowloon", "his", "of", "son", "in", "December 1969", "born", "of", "when", "Xiaohai ZHANG", "ran", "has", "own", "of", and "dress shop" | a title (tailor). It is assumed that a data subject selected or input by the user is Xiaohai ZHANG, and a relationship selected to input is father_son (X, Y), to indicate that X is a son of Y; and a data subject selected to input is Xiaoyang ZHANG, and a relationship selected to input is born (E1, E2), to indicate that a birthday of E1 is E2. Finally displayed relational data includes "Xiaohai ZHANG", "father_son (X, Y)", and "Xiaoyang ZHANG"; and "Xiaoyang ZHANG", born (E1, E2), and "December 1969".

It is assumed that the user selects privacy data in the relational data as a masking target, namely, "Xiaoyang ZHANG" and "December 1969", and a selected masking algorithm is cover masking. In this case, a data source obtained through masking processing includes File 1 and File 2. Content of File 1 includes: A father of * is a famous dress tailor Xiaohai ZHANG. File 2: Xiaohai ZHANG was born in Kowloon, Hong Kong, and ran his own dress shop when his son was born in ******. It can be learned that, in the data masking method provided in embodiments of this In the data masking method provided in embodiments of this disclosure, masking processing is performed on target relational data in a data source based on the target relational data selected by a user, to effectively exclude data that does not need to be masked, and implement flexible masking of data in the data source. In addition, at least one group of relational data is displayed, so that the user can accurately select a to-be-masked object, thereby improving masking accuracy.

Privacy data in the data source is scattered and isolated in the data source. When one or more groups of relational data are obtained from the data source (for example, obtained by using a relationship extraction technology), because the relational data includes a data subject, privacy data, and a relationship between the data subject and the privacy data, the privacy data is associated with the data subject. The user can more intuitively discover, by using the one or more groups of relational data, the privacy data associated with the data subject, and the privacy data is no longer scattered and isolated data, so that the user can more accurately perform masking processing on the relational data.

It may be understood that, a sequence of the steps of the data masking method in embodiments of this disclosure may be appropriately adjusted, and the steps may also be correspondingly added or deleted depending on a situation. All variant methods readily figured out by a person skilled in the art within the technical scope disclosed in this disclosure shall fall within the protection scope of this disclosure, and therefore are not described.

Figure 13:
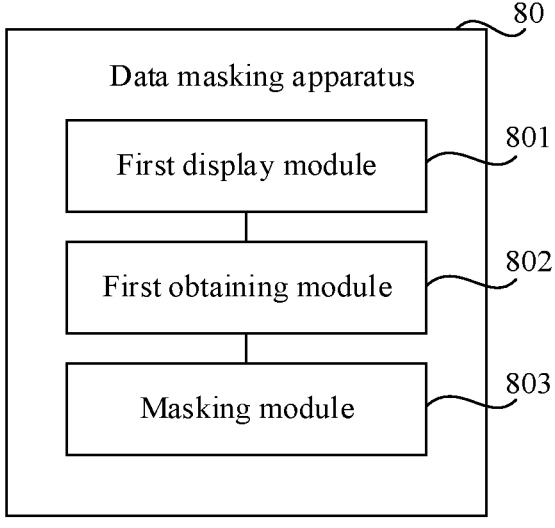
FIG. 13 is a block diagram of a data masking apparatus according to an embodiment of this disclosure.

FIG. 13 is a block diagram of a data masking apparatus 80 according to an embodiment of this disclosure. The apparatus 80 includes: a first display module 801, configured to display one or more groups of relational data, where the relational data includes a data subject, privacy data, and a relationship that the data subject and the privacy data meet; a first obtaining module 802, configured to obtain selection of a user for target relational data in the one or more groups of relational data; and a masking module 803, configured to perform masking processing on the target relational data in a data source.

In the data masking apparatus provided in embodiments of this disclosure, a masking module performs masking processing on target relational data in a data source based on the target relational data selected by a user, to effectively exclude data that does not need to be masked, and implement flexible masking of data in the data source. In addition, a first display module displays at least one group of relational data, so that the user can accurately select a to-be-masked object, thereby improving masking accuracy.

Optionally, the apparatus further includes: a second obtaining module, configured to obtain selection of the user for a masking target in the target relational data, where the masking target is one or more of the following: the data subject, the privacy data, and the relationship that the data subject and the privacy data meet.

Optionally, the apparatus further includes: a first determining module, configured to determine, from the data source stored in a cloud computing system, the target relational data that meets a data masking condition.

In an optional manner, the masking module is configured to: perform hash masking, cover masking, replacement masking, transform masking, encryption masking, or shuffle masking on the masking target in the target relational data in the data source, where the masking target is one or more of the following: the data subject, the privacy data, and the relationship that the data subject and the privacy data meet. In another optional manner, the masking module is configured to: obtain a masking degree specified by the user; and perform masking processing on the target relational data in the data source based on the masking degree.

In actual implementation, in an optional case, the apparatus further includes: a sending module, configured to provide a data source obtained through masking processing for a data analysis device. In another optional case, the apparatus further includes: a sharing module, configured to share the data source obtained through masking processing.

Optionally, the apparatus further includes: a second display module, configured to display a confidence of the one or more groups of relational data, where the confidence reflects credibility that the data subject and the privacy data meet the relationship, and the confidence is a reference for the user to select the target relational data.

Optionally, the apparatus further includes: a second determining module, configured to determine the confidence based on prior knowledge of the relational data provided by the user.

Optionally, the apparatus further includes: a third obtaining module, configured to obtain a data subject, and obtain a relationship; and a fourth obtaining module, configured to obtain, from the data source, privacy data that meets the obtained relationship with the obtain data subject, where the obtained data subject, the obtained privacy data, and the obtained relationship form the relational data.

The third obtaining module is configured to: display one or more data subjects in the data source; and obtain a data subject selected by the user from the one or more data subjects, or obtain a new data subject input by the user. The third obtaining module is also configured to: display one or more relationships; and obtain a relationship selected by the user from the one or more relationships, or obtain a new relationship input by the user.

For example, the first display module is configured to: display the one or more groups of relational data in a form of a knowledge graph. Optionally, the third display module is configured to display new relational data obtained by performing knowledge reasoning based on the knowledge graph, where the new relational data is a reference for the user to select new target relational data, or the new relational data is a reference for the user to determine a new relationship.

Figure 14:
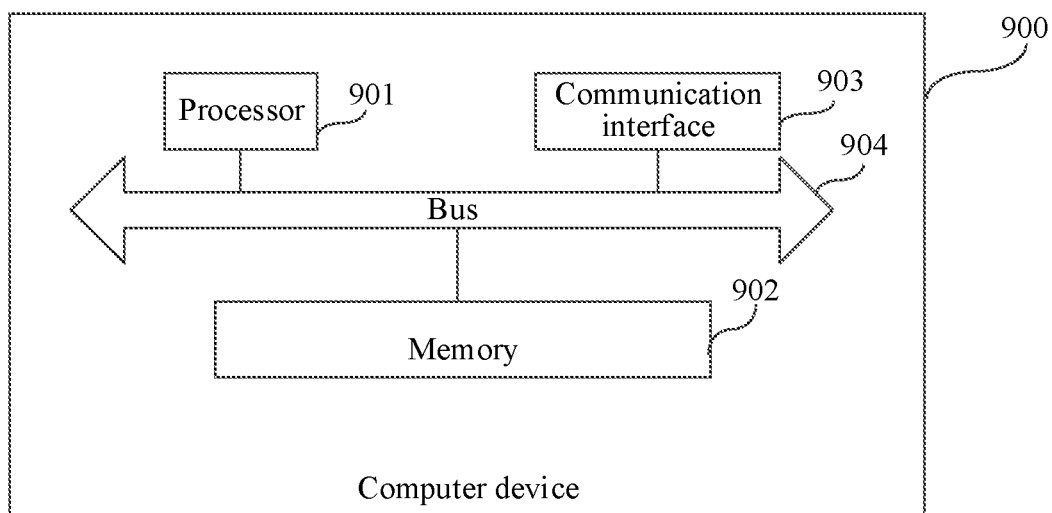
FIG. 14 is a possible basic hardware architecture diagram of a computer device according to an embodiment of this disclosure.

FIG. 14 is a possible basic hardware architecture diagram of a computer device according to an embodiment of this disclosure. Refer to FIG. 14. A computer device 700 includes a processor 701, a memory 702, a communication interface 703, and a bus 704.

In the computer device 700, there may be one or more processors 701. FIG. 14 shows only one of the processors 701. Optionally, the processor 701 may be a central processing unit (CPU). If the computer device 700 includes a plurality of processors 701, the plurality of processors 701 may be of a same type or different types. Optionally, the plurality of processors 701 of the computer device 700 may further be integrated as a multi-core processor.

The memory 702 stores computer instructions and data. The memory 702 may store computer instructions and data that are required for implementing the data masking method provided in this disclosure. For example, the memory 702 stores instructions for implementing the steps of the data masking method. The memory 702 may be any one or any combination of the following storage media: a nonvolatile memory (for example, a read-only memory (ROM), a solid-state drive (SSD), a hard disk drive (HDD), or an optical disc), and a volatile memory.

The communication interface 703 may be any one or any combination of components having a network access function such as a network interface (for example, an Ethernet interface) and a wireless network interface card.

The communication interface 703 is configured to perform data communication between the computer device 700 and another computer device or terminal.

The bus 704 may connect the processor 701 to the memory 702 and the communication interface 703. In this way, the processor 701 may access the memory 702 through the bus 704, and may further exchange data with the other computer device or terminal through the communication interface 703.

In this disclosure, the computer device 700 executes the computer instructions in the memory 702, to enable the computer device 700 to implement the data masking method provided in this disclosure, or enable the computer device 700 to deploy a database system.

In an example embodiment, a non-transitory computer-readable storage medium including instructions, for example, a memory including instructions, is further provided. The instructions may be executed by a processor of a server to complete the data masking method shown in embodiments of this disclosure. For example, the non-transitory computer-readable storage medium may be a ROM, a random-access memory (RAM), a compact disc read-only memory (CD-ROM), a magnetic tape, a floppy disk, an optical data storage device, or the like.

An embodiment of this disclosure provides a data masking system. As shown in FIG. 1, the data masking system includes a terminal 110 and a processing device 120. The processing device 120 is any processing device provided in embodiments of this disclosure. For other explanations of the terminal 110 and the processing device 120, refer to corresponding explanations in FIG. 1.

Figure 15:
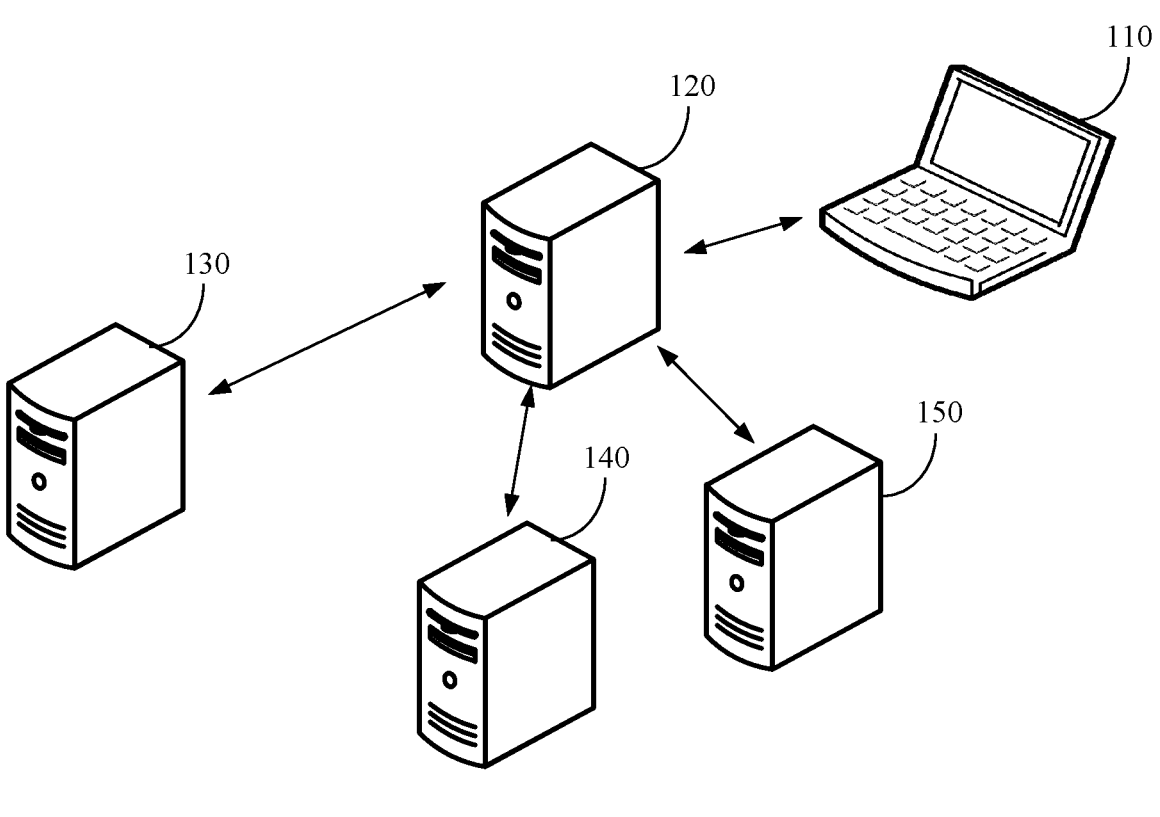
FIG. 15 is a schematic diagram of a structure of a data masking system according to an embodiment of this disclosure.

FIG. 15 is a schematic diagram of a structure of a data masking system according to an embodiment of this disclosure. The data masking system further includes one or more storage devices, to store data in the data masking method. As shown in FIG. 15, the data masking system further includes a data source storage device 130. The data source storage device 130 may be a server, or a server cluster formed by several servers. The data source storage device 130 is configured to store a data source. The data source may be a data source of an OBS type, an RDS type, a big data type, a code library type, or another database type. Optionally, the processing device 120 may provide a unified identity authentication service, and provides a unified interface for accessing different types of data sources. The interface is used by a user to process a data source with authorization, for example, read or delete the data source.

Optionally, when a sensitive data discovery technology is used to discover a data subject and/or privacy data, the data masking system further includes: a discovery data storage device 140. The discovery data storage device 140 may be a server, or a server cluster formed by several servers. The discovery data storage device 140 is configured to store data discovered by using a privacy data discovery technology, for example, data subjects and/or privacy data. The discovery data storage device 140 may further store target data required for establishing a knowledge graph and a relationship extraction technology, for example, the foregoing NLP annotation array, metadata of a data source (such as a file), and/or a path of source data in which the privacy data is located. Correspondingly, the processing device 120 may deploy a sensitive data discovery engine, to read different types of data sources and scan the data sources in a plurality of manners, to discover data subjects and/or privacy data in the data sources.

Optionally, when the processing device supports a knowledge graph function, the data masking system further includes a knowledge graph storage device 150. The knowledge graph storage device 150 may be a server, or a server cluster formed by several servers. The knowledge graph storage device 150 is configured to store data required for knowledge reasoning of a knowledge graph.

All or a part of the foregoing embodiments may be implemented by software, hardware, firmware, or any combination thereof. When the software is used to implement embodiments, all or some of embodiments may be implemented in a form of a computer program product. The computer program product includes one or more computer instructions. When the computer program instructions are loaded and executed on a computer, the procedure or functions according to embodiments of this disclosure are all or partially generated. The computer may be a general-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, an HDD, or a magnetic tape), an optical medium, a semiconductor medium (for example, an SSD), or the like.

In this disclosure, the terms "first", "second", and "third" are merely used for description, but cannot be understood as an indication or implication of relative importance. The term "at least one" means one or more, and the term "a plurality of" means two or more, unless otherwise expressly limited. A refers to B, which means that A is the same as B or A is a simple variant of B. The term "and/or" in this disclosure describes only an association relationship for describing associated objects and represents that three relationships may exist. For example, A and/or B may represent the following three cases: only A exists, both A and B exist, and only B exists.

It may be understood that, when the database system provided in the foregoing embodiment performs the data masking method, only divisions of the foregoing functional modules are described by using an example. During practical application, the foregoing functions may be allocated to and completed by different functional modules according to the may be understood, that is, the internal structure of the device is divided into different functional modules, to complete all or part of the functions described above. In addition, the database system provided in the embodiment above and the embodiment of the data masking method belong to a same concept. For a specific implementation process, reference is made to the method embodiments. Details are not described herein again.

A person of ordinary skill in the art may understand that all or some of the steps of the embodiments may be implemented by hardware or a program instructing related hardware. The program may be stored in a computer-readable storage medium. The storage medium may be a ROM, a magnetic disk, or an optical disc.

The foregoing descriptions are merely optional embodiments of this disclosure, but are not intended to limit this disclosure. Any modification, equivalent replacement, or improvement made without departing from the spirit and principle of this disclosure should fall within the protection scope of this disclosure.

What is claimed is:

1. A method, comprising:
displaying, on a display of an electronic device, a first user interface comprising one or more groups of relational data, wherein the relational data comprises a data subject, privacy data, and a relationship between the data subject and the privacy data;
obtaining, from an input device of the electronic device, a masking degree and a first selection of target relational data in the one or more groups;
performing, by one or more processors of the electronic device, in a data source, and based on the masking degree, masking processing on the target relational data to obtain masked relational data; and displaying, on the display of the electronic device, a second user interface comprising the masked relational data.

2. The method of claim 1, further comprising obtaining, from the input device of the electronic device, a second selection of a masking target in the target relational data, wherein the masking target comprises the data subject, the privacy data, or the relationship.

3. The method of claim 2, wherein performing the masking processing comprises performing, by the one or more processors of the electronic device and in the data source, hash masking, cover masking, replacement masking, transform masking, encryption masking, or shuffle masking on the masking target, and wherein the masking target comprises the data subject, the privacy data, or the relationship.

4. The method of claim 1, wherein the data source is from a cloud computing system, and wherein the method further comprises obtaining, from the data source and based on the target relational data meeting a data masking condition, the target relational data.

5. The method of claim 1, wherein after performing the masking processing, the method further comprises providing, to a data analysis device, the data source.

6. The method of claim 1, further comprising sharing the data source.

7. The method of claim 1, further comprising displaying, for the one or more groups of relational data, a confidence, wherein the confidence reflects credibility that the data subject and the privacy data have the relationship, and wherein the confidence is a reference for the user to select the target relational data.

8. The method of claim 1, further comprising:
obtaining the data subject and the relationship; and
obtaining, from the data source, privacy data that has the relationship with the data subject.

9. The method of claim 1, wherein the first user interface displays the one or more groups in a form of a knowledge graph.

10. An apparatus, comprising:
a display;
an input device;
a memory configured to store instructions; and
one or more processors coupled to the display, the input device, and the memory and configured to execute the instructions to:
display, on the display, a first user interface comprising one or more groups of relational data, wherein the relational data comprises a data subject, privacy data, and a relationship between the data subject and the privacy data;
obtain, from the input device, a masking degree and a first selection of target relational data in the one or more groups;
perform, in a data source and based on the masking degree, masking processing on the target relational data to obtain masked relational data; and
display, on the display, a second user interface comprising the masked relational data.

11. The apparatus of claim 10, wherein the one or more processors are further configured to execute the instructions to obtain, from the input device, a second selection of a masking target in the target relational data, and wherein the masking target comprises the data subject, the privacy data, or the relationship.

12. The apparatus of claim 11, wherein the one or more processors are further configured to execute the instructions to perform, in the data source, hash masking, cover masking, replacement masking, transform masking, encryption masking, or shuffle masking on the masking target, and wherein the masking target comprises the data subject, the privacy data, or the relationship.

13. The apparatus of claim 10, wherein the data source is from a cloud computing system, and wherein the one or more processors are further configured to execute the instructions to obtain, from the data source and based on the target relational data meeting a data masking condition, the target relational data.

14. The apparatus of claim 10, wherein the one or more processors are further configured to execute the instructions to provide, to a data analysis device, the data source.

15. The apparatus of claim 10, wherein the one or more processors are further configured to share the data source.

16. The apparatus of claim 10, wherein the one or more processors are further configured to display, for the one or more groups of relational data, a confidence, wherein the confidence reflects credibility that the data subject and the privacy data have the relationship, and wherein the confidence is a reference for the user to select the target relational data.

17. The apparatus of claim 10, wherein the one or more processors are further configured to:
obtain the data subject and the relationship; and
obtain, from the data source, privacy data that has the relationship with the data subject.

18. The apparatus of claim 10, wherein the first user interface displays the one or more groups in a form of a knowledge graph.

19. The method of claim 1, wherein the masked relational data displayed in the second user comprises an element, and wherein after performing the masking processing, a proportion of masked characters in the element to total characters in element is equal to the masking degree.

20. A method, comprising:
displaying, on a display of an electronic device, a first user interface comprising one or more groups of relational data, wherein the relational data comprises a data subject, privacy data, and a relationship between the data subject and the privacy data;
obtaining, from an input device of the electronic device, a first selection of target relational data in the one or more groups and a second selection of a masking target in the target relational data, wherein the masking target comprises the data subject, the privacy data, or the relationship;
performing, by one or more processors of the electronic device and in a data source, masking processing on the target relational data to obtain masked relational data by performing hash masking, cover masking, replacement masking, transform masking, encryption masking, or shuffle masking on the masking target; and
displaying, on the display of the electronic device, a second user interface comprising the masked relational data.

* * * * *